(12) United States Patent
Kim et al.

(10) Patent No.: US 10,887,872 B2
(45) Date of Patent: Jan. 5, 2021

(54) METHOD AND APPARATUS FOR TRANSMITTING AND RECEIVING MULTI-SLOT BASED LONG PUCCHS IN A WIRELESS COMMUNICATION SYSTEM

(71) Applicant: LG ELECTRONICS INC., Seoul (KR)

(72) Inventors: Jaehyung Kim, Seoul (KR); Suckchel Yang, Seoul (KR); Seonwook Kim, Seoul (KR); Changhwan Park, Seoul (KR); Joonkui Ahn, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/180,471

(22) Filed: Nov. 5, 2018

(65) Prior Publication Data
US 2019/0141698 A1  May 9, 2019

Related U.S. Application Data

(60) Provisional application No. 62/616,467, filed on Jan. 12, 2018, provisional application No. 62/595,062, filed on Dec. 5, 2017, provisional application No. 62/593,812, filed on Dec. 1, 2017, provisional application No. 62/591,776, filed on Nov. 29, 2017, provisional application No. 62/586,918, filed on Nov. 16, 2017, provisional application No. 62/581,087, filed on Nov. 3, 2017.

(51) Int. Cl.
*H04W 4/00* (2018.01)
*H04W 72/04* (2009.01)
*H04L 5/14* (2006.01)

(52) U.S. Cl.
CPC ........... *H04W 72/0413* (2013.01); *H04L 5/14* (2013.01); *H04W 72/0446* (2013.01)

(58) Field of Classification Search
CPC   H04W 72/0413; H04W 72/0446; H04L 5/14; H04L 5/001; H04L 5/0055
USPC ................................................. 370/329, 330
See application file for complete search history.

(56) References Cited

U.S. PATENT DOCUMENTS

2016/0337157 A1   11/2016   Papasakellariou
2017/0163388 A1   6/2017   Wiemann et al.
(Continued)

OTHER PUBLICATIONS

Samsung, "Multi-Slot Long PUCCH Transmission," R1-1717653, 3GPP TSG RAN WG1 Meeting #90b, Prague, CZ, dated Oct. 2, 2017, 7 pages.
(Continued)

*Primary Examiner* — Chuong T Ho
(74) *Attorney, Agent, or Firm* — Fish & Richardson P.C.

(57) ABSTRACT

This specification provides a long PUCCH using multiple slots in a wireless communication system. The method is performed by a user equipment and includes receiving first information about a TDD UL-DL slot configuration from a base station, receiving, from the base station, second information including a first parameter for a number of slots used for a transmission of the long PUCCH and a second parameter for a duration of a PUCCH symbol within a PUCCH slot, determining the multiple slots for transmitting the long PUCCH based on the first information and the second information, and transmitting the long PUCCH to the base station over the determined slots.

7 Claims, 10 Drawing Sheets

(56) References Cited

U.S. PATENT DOCUMENTS

| | | | | |
|---|---|---|---|---|
| 2018/0124815 | A1* | 5/2018 | Papasakellariou | H04L 1/1861 |
| 2018/0192417 | A1* | 7/2018 | Yin | H04W 72/0413 |
| 2018/0220414 | A1* | 8/2018 | Yin | H04W 72/0413 |
| 2019/0052421 | A1* | 2/2019 | Yin | H04L 5/0053 |
| 2019/0052422 | A1* | 2/2019 | Yin | H04L 5/0055 |
| 2019/0081763 | A1* | 3/2019 | Akkarakaran | H04L 1/0026 |
| 2019/0123839 | A1* | 4/2019 | Tamane | G07C 9/00309 |
| 2019/0150143 | A1* | 5/2019 | Yin | H04W 72/0446 370/329 |
| 2019/0173620 | A1* | 6/2019 | Oh | H04L 1/1861 |
| 2019/0312958 | A1* | 10/2019 | Zhang | H04L 27/2666 |
| 2020/0052811 | A1* | 2/2020 | Li | H04W 80/08 |

OTHER PUBLICATIONS

Huawei, "Support of long-PUCCH over multiple slots," R1-1717071, 3GPP TSG RAN WG1 Meeting #90bis, Prague, Czech Republic, dated Oct. 2, 2017, 8 pages.

LG Electronics, "Support of long PUCCH over multiple slots for NR," R1-1717961, 3GPP TSG RAN WG1 Meeting 90bis, Prague, CZ, dated Oct. 9-13, 2017, 7 pages.

LG Electronics, "Support of long PUCCH over multiple slots for NR," R1-1715881, 3GPP TSG RAN WG1 Meeting NR#3, Nagoya, Japan, dated Sep. 18-21, 2017, 6 pages.

Ericsson, "On PUCCH Resource Allocation," R1-1718811, 3GPP TSG RAN WG1 Meeting#90bis, Prague, Czech Republic, dated Oct. 9, 2017, 12 pages.

Samsung, "DL and UL Assignment for NR TDD," R1-1715986, 3GPP TSG RAN WG1 Meeting NR#3, Nagoya, Japan, dated Sep. 12, 2017, 6 pages.

$3^{rd}$ Generation Partnership Project; Guangdong OPPO Mobile Telecom; "Slot aggregation and configuration for NR long PUCCH," R1-1707713, 3GPP TSG RAN WG1, Hangzhou, PR, China, dated May 2017, 5 pages.

Extended European Search Report in European Appln. No. 18874353.8, dated Jun. 25, 2020, 12 pages.

* cited by examiner

[FIG. 1]
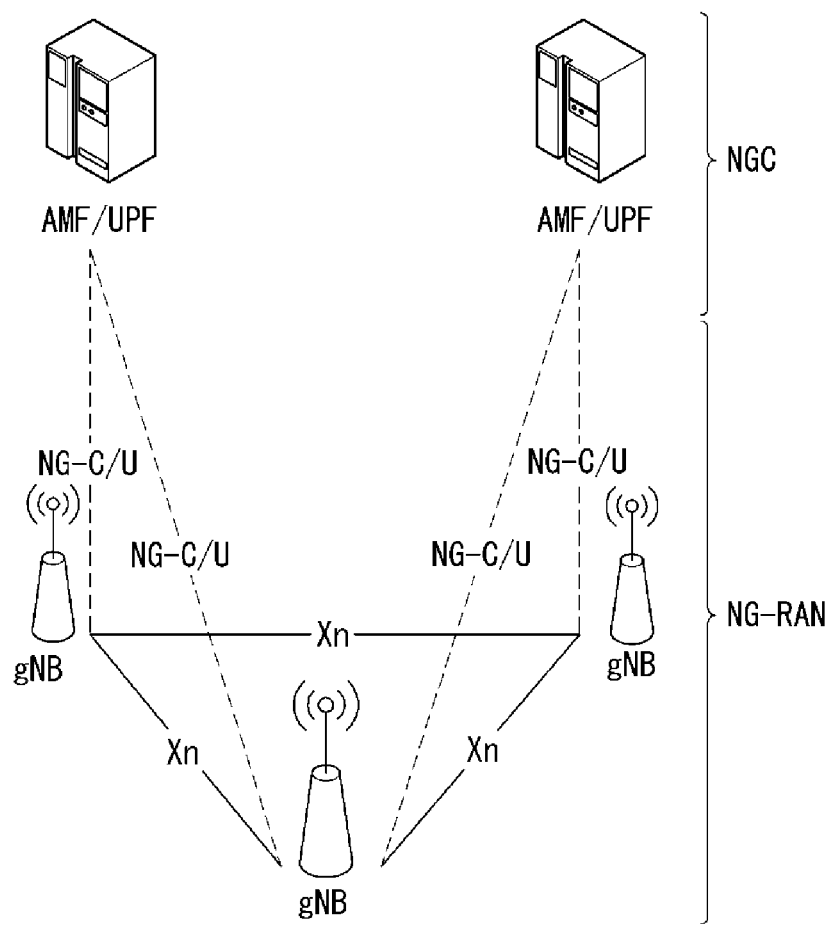

[FIG. 2]
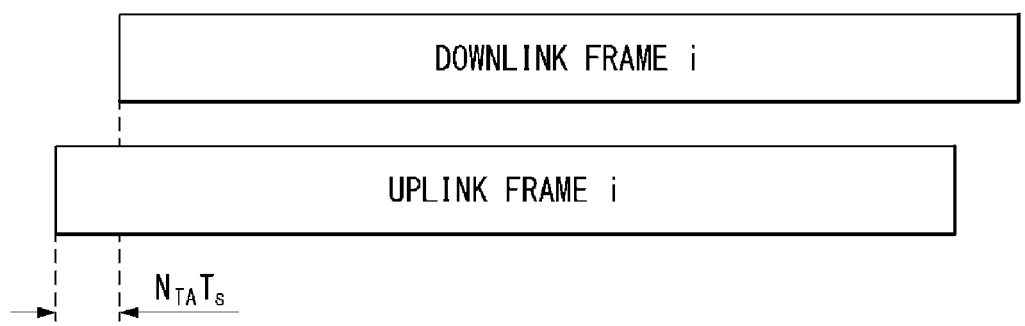

[FIG. 3]
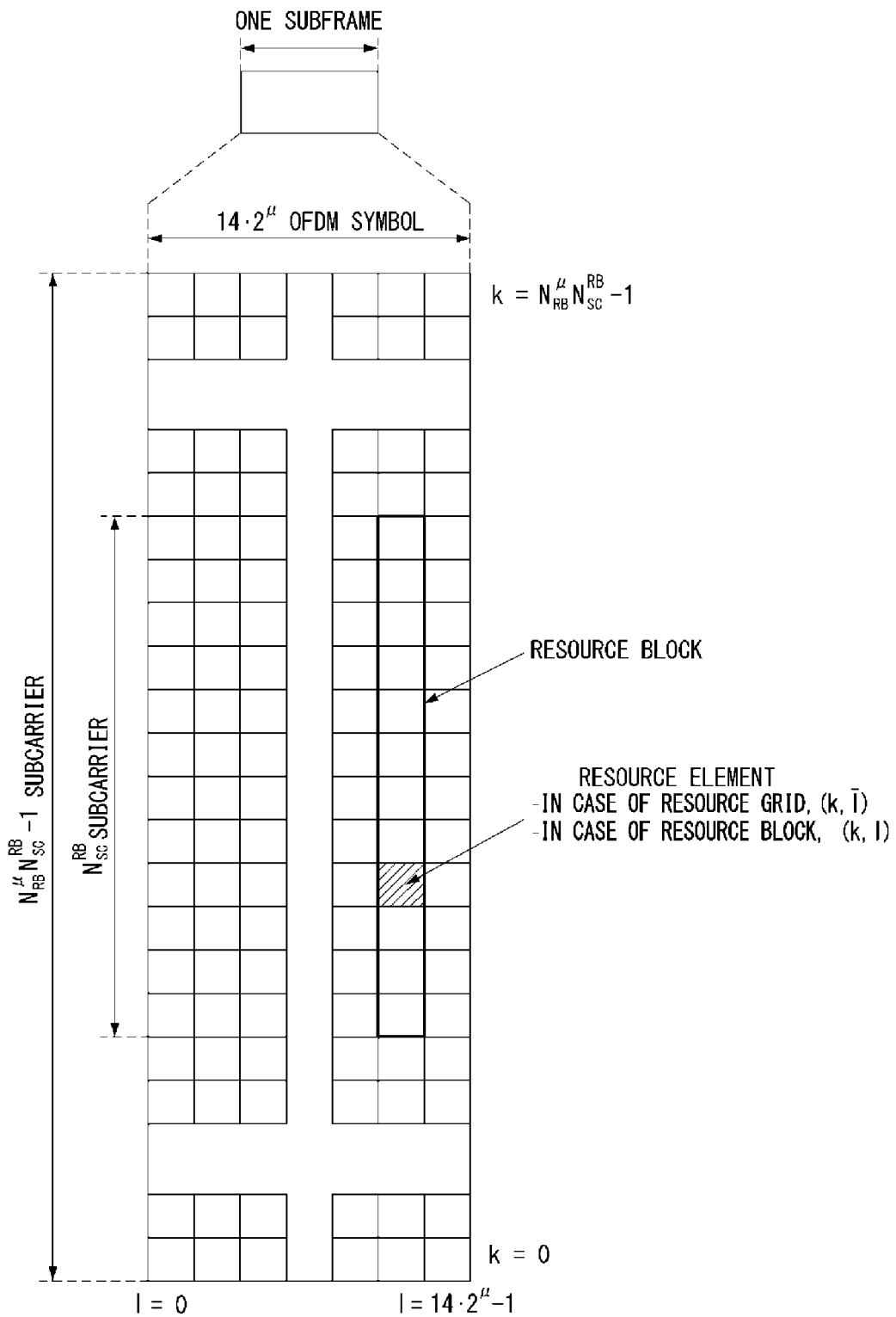

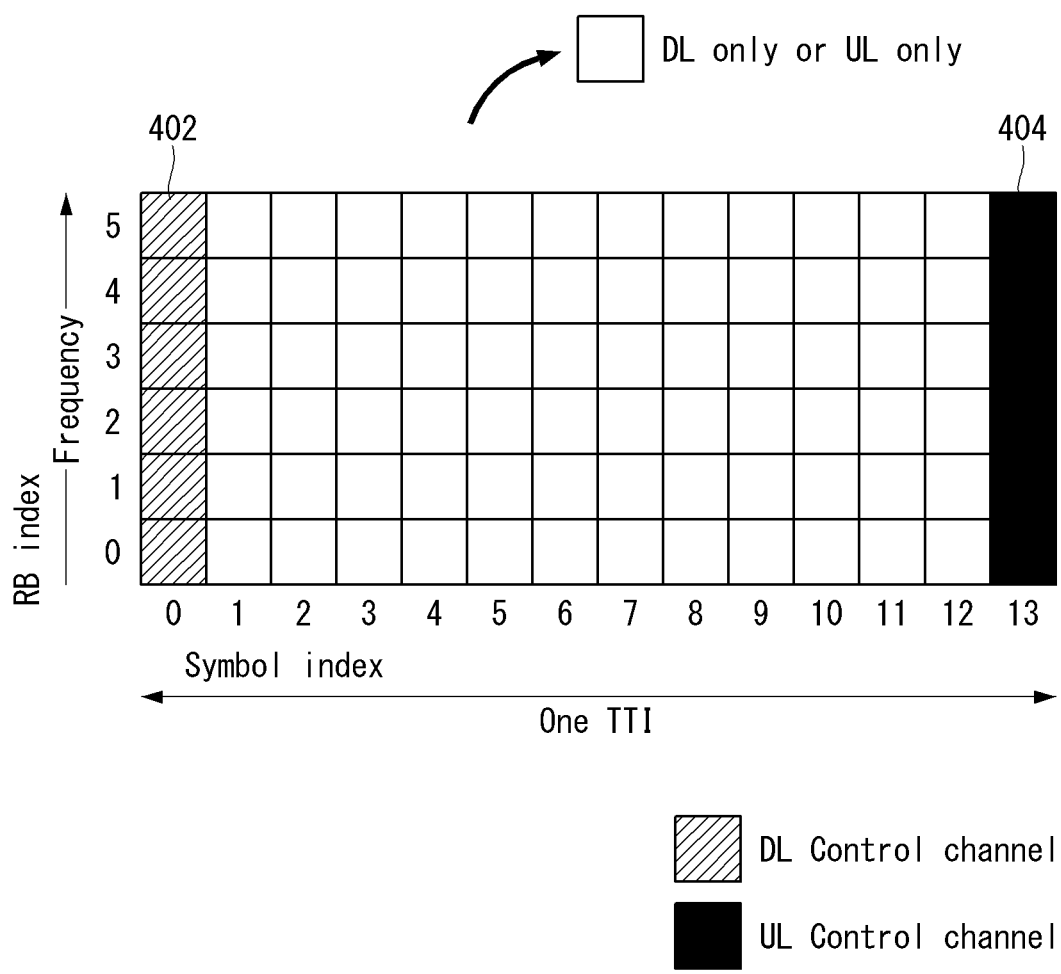
[FIG. 4]

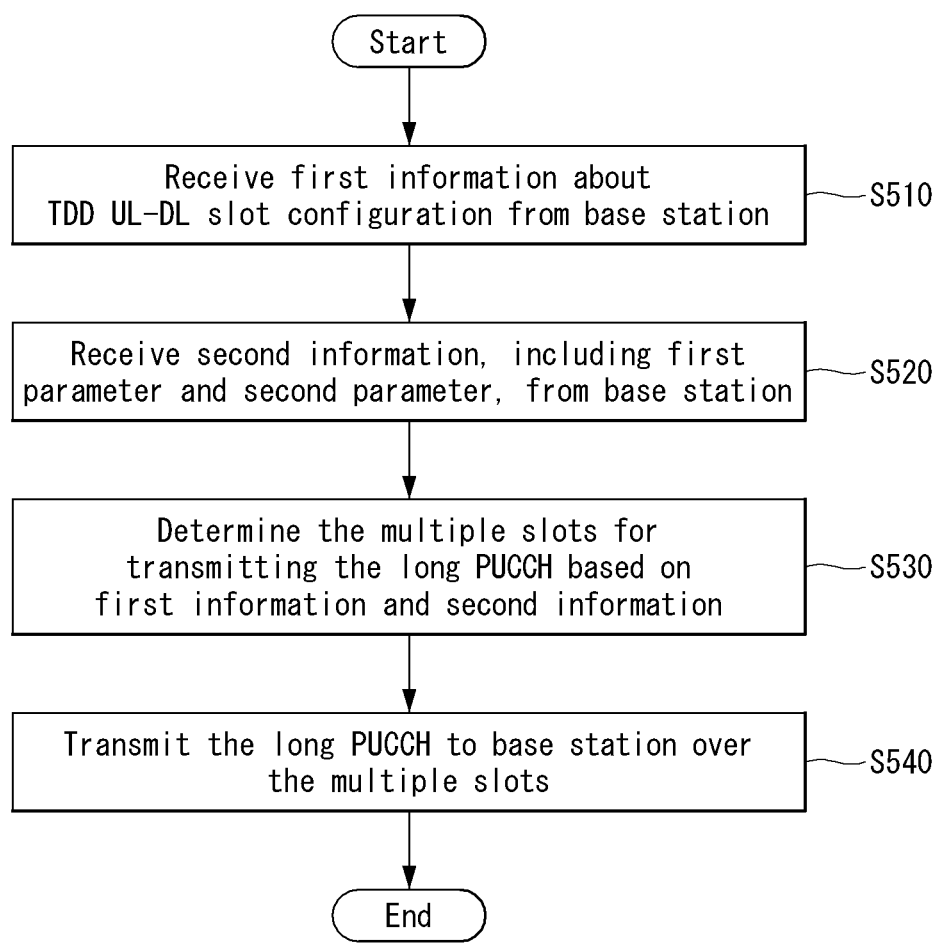
[FIG. 5]

[FIG. 6]
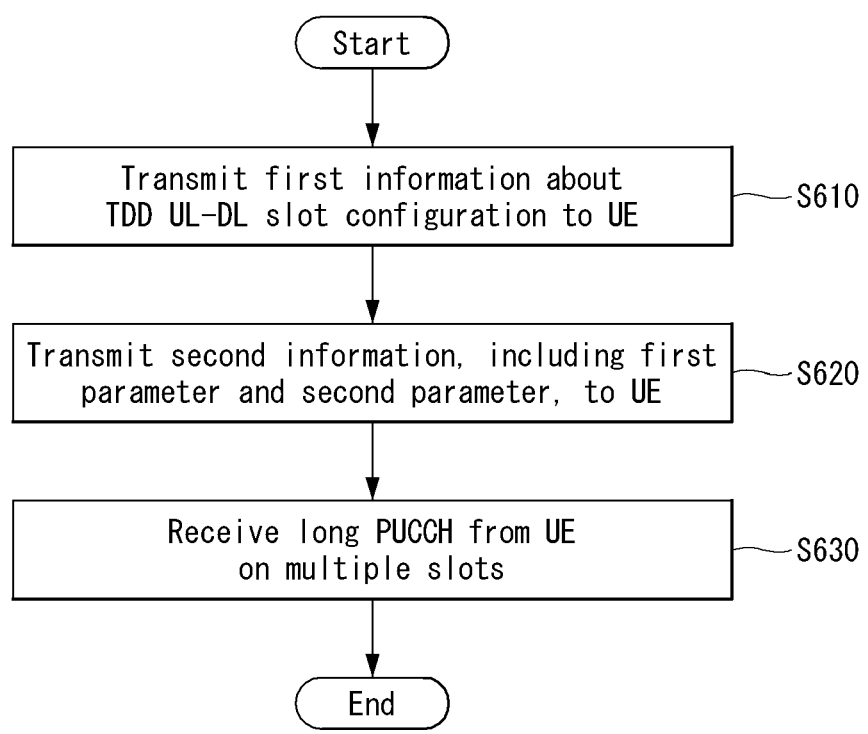

[FIG. 7]
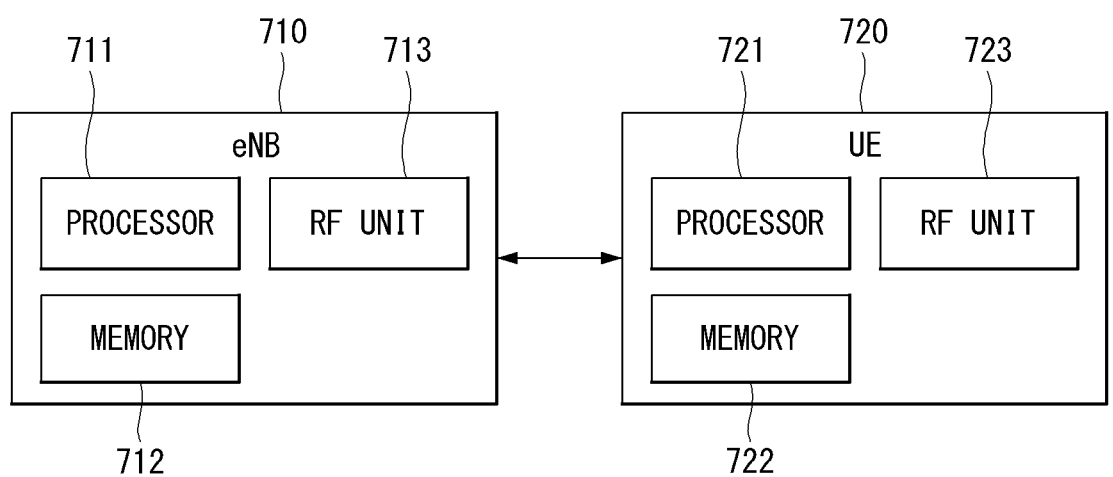

[FIG. 8]
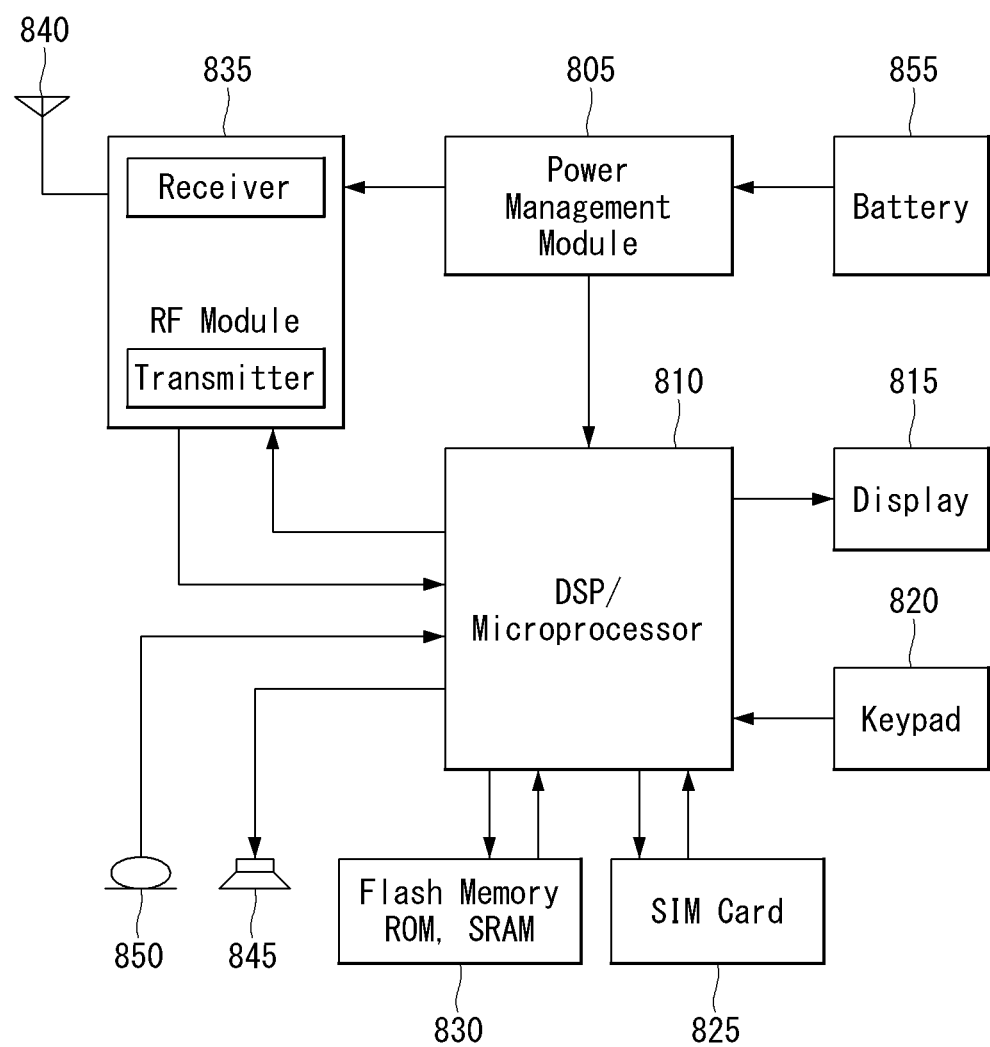

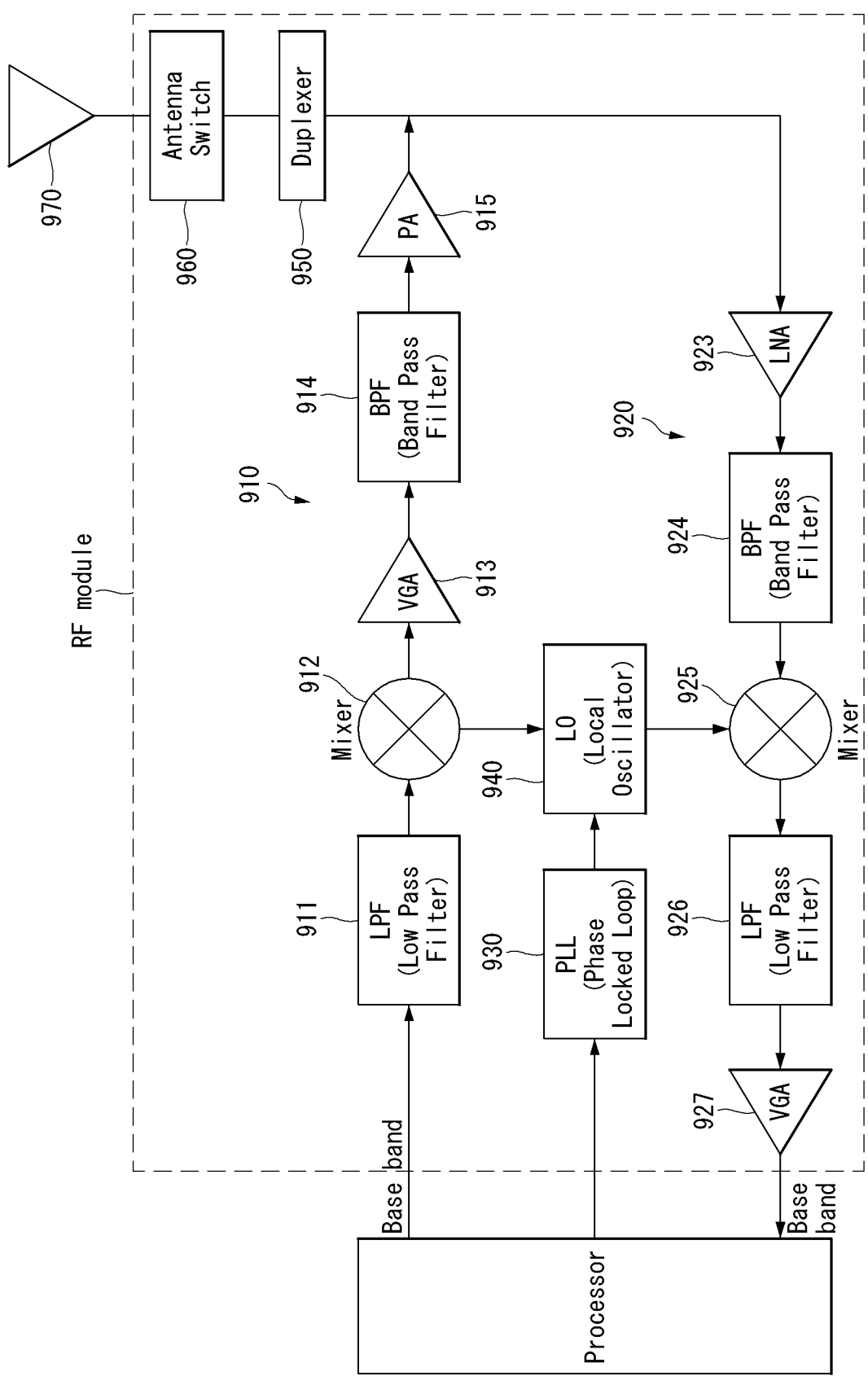
[FIG. 9]

[FIG. 10]
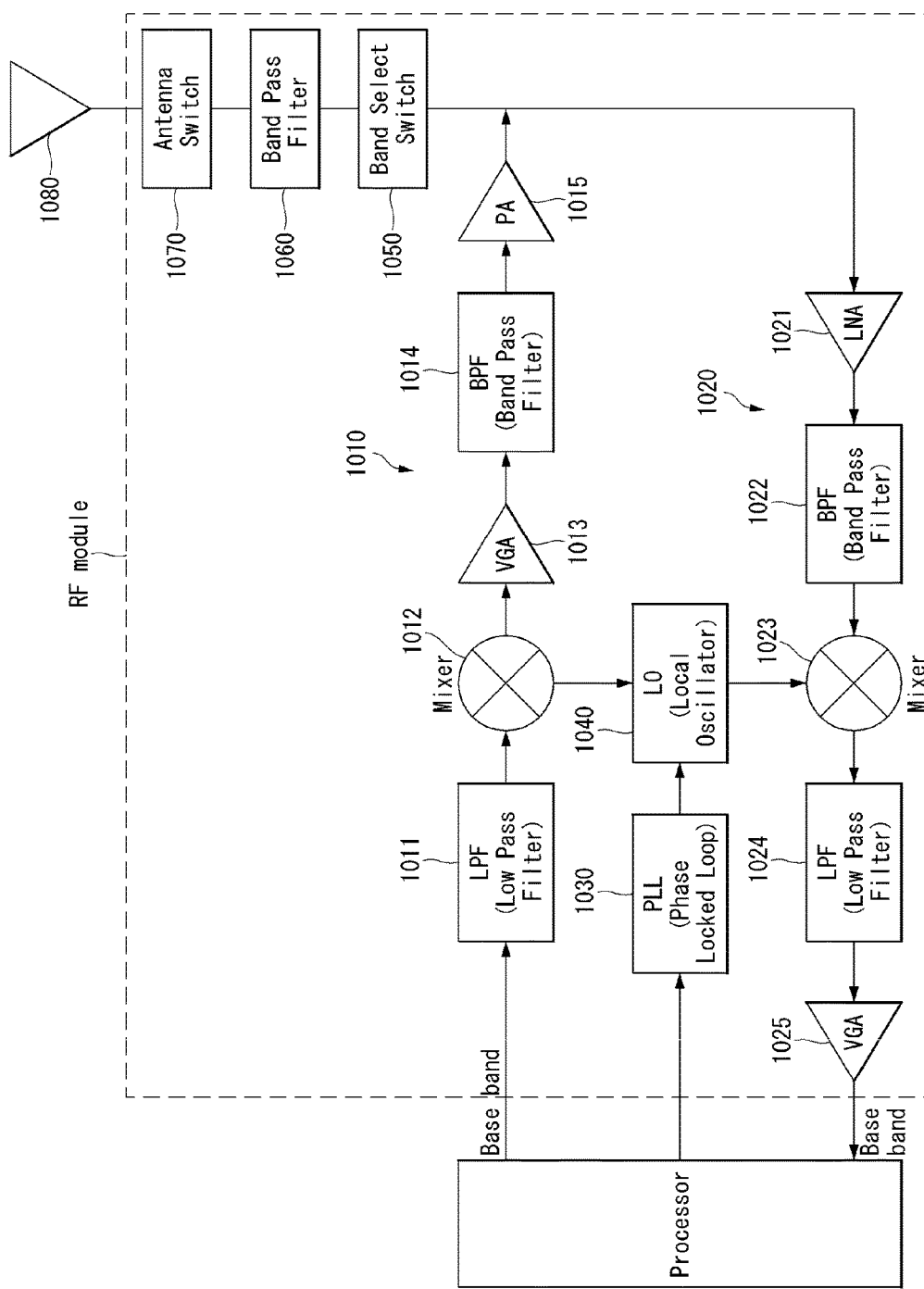

METHOD AND APPARATUS FOR TRANSMITTING AND RECEIVING MULTI-SLOT BASED LONG PUCCHS IN A WIRELESS COMMUNICATION SYSTEM

CROSS-REFERENCE TO RELATED APPLICATIONS

This application claims the benefit of U.S. Provisional Application No. 62/581,087 filed on Nov. 3, 2017, U.S. Provisional Application No. 62/586,918 filed on Nov. 16, 2017, U.S. Provisional Application No. 62/591,776 filed on Nov. 29, 2017, U.S. Provisional Application No. 62/593,812 filed on Dec. 1, 2017, U.S. Provisional Application No. 62/595,062 filed on Dec. 5, 2017, U.S. Provisional Application No. 62/616,467 filed on Jan. 12, 2018. The contents of the prior applications are hereby incorporated by reference in their entirety.

BACKGROUND OF THE INVENTION

Field of the Invention

This specification relates to a wireless communication system, and more specifically, to a method for transmitting and receiving a long physical uplink control channel (PUCCH) using multiple slots and an apparatus supporting the same.

Related Art

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY OF THE INVENTION

This specification provides a method of configuring a multi-slot long PUCCH for repeatedly transmitting a long PUCCH based on numerology, a slot format indicator, etc. for coverage extension.

The technical objects of the present invention are not limited to the aforementioned technical objects, and other technical objects, which are not mentioned above, will be apparently appreciated by a person having ordinary skill in the art from the following description.

This specification provides a method of transmitting a long physical uplink control channel (PUCCH) using multiple slots in a wireless communication system.

More specifically, the method performed by a user equipment includes receiving first information about a time division duplex (TDD) uplink (UL)-downlink (DL) slot configuration from a base station, receiving, from the base station, second information including a first parameter for the number of slots used for a transmission of the long PUCCH and a second parameter for a duration of a PUCCH symbol within a PUCCH slot, determining the multiple slots for transmitting the long PUCCH based on the first information and the second information, and transmitting the long PUCCH over the base station on the multiple slots.

Furthermore, in this specification, the multiple slots for transmitting the long PUCCH is determined to be a specific number of slots from a configured starting slot.

Furthermore, in this specification, the specific number of slots is configured with an UL slot or an unknown slot.

Furthermore, in this specification, the number of UL symbols available for a transmission of the long PUCCH within the UL slot is greater than or equal to the second parameter.

Furthermore, in this specification, when the number of UL symbols available for the transmission of the long PUCCH within a specific slot of the determined slots is smaller than the second parameter, the long PUCCH is not transmitted on the specific slot.

Furthermore, in this specification, the method further includes receiving a slot format indicator (SFI) for providing notification of a specific TDD UL-DL slot format from the base station.

Furthermore, in this specification, the long PUCCH is transmitted using a pre-discrete Fourier transform (DFT) orthogonal cover code (OCC).

Furthermore, in this specification, the long PUCCH resource is determined by pairing an OCC related to an uplink control information (UCI) part and a cyclic shift (CS) related to a reference signal.

Furthermore, in this specification, a user equipment transmitting a long physical uplink control channel (PUCCH) using multiple slots in a wireless communication system includes a radio frequency (RF) module for transmitting and receiving radio signals and a processor functionally connected to the RF module, wherein the processor is configured to receive first information about a time division duplex (TDD) uplink (UL)-downlink (DL) slot configuration from a base station, receive, from the base station, second information including a first parameter for the number of slots used for a transmission of the long PUCCH and a second parameter for a duration of a PUCCH symbol within a PUCCH slot, determining the multiple slots for transmitting the long PUCCH based on the first information and the second information, and transmitting the long PUCCH to the base station over the multiple slots.

Furthermore, in this specification, the processor is configured to not transmit the long PUCCH on a specific slot when the number of UL symbols available for a transmission of the long PUCCH transmission within the specific slot of the determined slots is smaller than the second parameter.

Furthermore, in this specification, the processor is configured to receive a slot format indicator (SFI) for providing notification of a specific TDD UL-DL slot format from the base station.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 shows an example of an overall system structure of an NR to which a method proposed in this specification may be applied.

FIG. 2 shows the relation between an uplink frame and a down frame in a wireless communication system to which a method proposed in this specification may be applied.

FIG. 3 shows an example of a resource grid supported in a wireless communication system to which a method proposed in this specification may be applied.

FIG. 4 shows an example of a self-contained subframe structure to which a method proposed in this specification may be applied.

FIG. 5 is a flowchart showing an example of an operation method of a UE for transmitting a long PUCCH using multiple slots, which is proposed in this specification.

FIG. 6 is a flowchart showing an example of an operation method of a base station for receiving a long PUCCH using multiple slots, which is proposed in this specification.

FIG. 7 shows a block diagram of a wireless communication apparatus to which methods proposed in this specification may be applied.

FIG. 8 shows a block diagram of a communication apparatus according to an embodiment of this document.

FIG. 9 shows an example of the RF module of a wireless communication apparatus to which a method proposed in this specification may be applied.

FIG. 10 shows another example of the RF module of a wireless communication apparatus to which a method proposed in this specification may be applied.

DETAILED DESCRIPTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

In addition, 5G NR (new radio) defines enhanced mobile broadband (eMBB), massive machine type communications (mMTC), ultra-reliable low latency communications (URLLC), and vehicle-to-everything.

The 5G NR standard distinguishes between standalone (SA) and non-standalone (NSA) depending on the co-existence between the NR system and the LTE system.

The 5G NR supports various subcarrier spacing, CP-OFDM in the downlink, CP-OFDM in the uplink, and DFT-s-OFDM (SC-OFDM).

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface
General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$[kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^{\mu} \in \{0, \ldots, N_{subframe}^{slots,\mu}-1\}$ subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu}N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $\bar{l}=0, \ldots, 2^{\mu}N_{symb}^{(\mu)}-1$ indicates a location of a symbol in a subframe. To indicate a resource element in a slot, the index pair (k,$\bar{l}$) is used. Herein $l=0, \ldots, N_{symb}^{\mu}-1$.

The resource element (k,$\bar{l}$) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p,\mu)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

A time division duplexing (TDD) structure taken into consideration in the NR system is a structure in which both uplink (UL) and downlink (DL) are processed in a single subframe. This is for minimizing latency of data transmission in the TDD system, and such a structure is called a self-contained subframe structure.

FIG. 4 shows an example of a self-contained subframe structure to which a method proposed in this specification may be applied. FIG. 4 is only for convenience of description, and does not limit the scope of the present invention.

Referring to FIG. 4, in the case of legacy LTE, a case where one subframe includes 14 orthogonal frequency division multiplexing (OFDM) symbols is assumed.

In FIG. 4, a region 402 means a downlink control region, and a region 404 means an uplink control region. Furthermore, a region (i.e., a region not having a separate indication) other than the region 402 and the region 404 may be used for the transmission of downlink data or the transmission of uplink data.

That is, uplink control information and downlink control information are transmitted in one self-contained subframe. In contrast, in the case of data, uplink data or downlink data is transmitted in one self-contained subframe.

If the structure shown in FIG. 4 is used, downlink transmission and uplink transmission are sequentially performed in one self-contained subframe. The transmission of downlink data and the reception of uplink ACK/NACK may be performed.

As a result, when an error of data transmission occurs, the time taken up to the retransmission of data may be reduced. Accordingly, latency related to data delivery can be minimized.

In a self-contained subframe structure such as FIG. 4, a time gap for a process for a base station (eNodeB, eNB, gNB) and/or a terminal (user equipment (UE)) to switch from a transmission mode to a reception mode or a process for the base station and/or the terminal to switch from the reception mode to the transmission mode is necessary. In relation to the time gap, if uplink transmission is performed in a self-contained subframe after downlink transmission, some OFDM symbol(s) may be configured as a guard period (GP).

Carrier Aggregation

A communication environment considered in embodiments of the present invention includes all multi-carrier support environments. That is, a multi-carrier system or carrier aggregation (CA) system used in the present invention is a system in which, when a target wide band is configured, one or more component carriers (CCs) having a bandwidth smaller than a target bandwidth are aggregated and used in order to support a wide band.

In the present invention, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as 'DL CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present invention may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller therethan.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. Here, the term 'cell' needs to be distinguished from a 'cell' as an area covered by the base station which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related S cell.

After an initial security activation process starts, the E-UTRAN may configure a network including one or more S cells in addition to the P cell initially configured in the connection establishment process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the S cell.

The NR system may support a physical uplink control channel (PUCCH), that is, a physical channel for transmitting uplink control information (UCI) including information, such as HARQ-ACK, a scheduling request (SR), channel state information (CSI).

In this case, the PUCCH may be divided into a small PUCCH supporting small UCI payload (e.g., 1~2-bit UCI) and a big PUCCH supporting large UCI payload (e.g., more than 2 bits and up to hundreds of bits) depending on UCI payload.

In addition, each of the small PUCCH and the big PUCCH may be divided into a short PUCCH having short duration (e.g., 1~2-symbol duration) and a long PUCCH having long duration (e.g., 4~14-symbol duration).

Table 4 shows an example of a PUCCH format.

TABLE 4

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

In Table 4, $N_{symb}^{PUCCH}$ indicates the length of PUCCH transmission in OFDM symbols. The PUCCH formats 1, 3 and 4 may be denoted as long PUCCHs, and the PUCCH formats 0 and 2 may be denoted as short PUCCHs.

A symbol "/" used in this specification may be interpreted as the same meaning as "and/or." "A and/or B" may be identically interpreted as "include at least one of A or B."

Furthermore, the Long PUCCH may be basically used to transmit medium/large UCI payload or improve coverage of small UCI payload.

Furthermore, if it is necessary to additionally expand coverage compared to a long PUCCH, a multi-slot long PUCCH in which the same UCI information is transmitted in multiple slots may be supported.

In this case, an operation of transmitting a long PUCCH using multiple slots may include an operation of repeatedly transmitting a long PUCCH in multiple slots.

For example, if coverage cannot be secured in a given UCI payload and code rate, coverage may need to be secured through a gain according to repetitive transmission using a multi-slot long PUCCH.

The LTE system supports only 15 kHz subcarrier spacing except a special case, such as an MBMS or an NB-IoT, whereas the NR system supports various numerologies, such as 15 kHz, 30 kHz, 60 kHz, 120 kHz and 240 kHz, by considering various use cases and deployment scenarios as described above.

In this case, the numerology refers to subcarrier spacing and a cyclic prefix (CP).

In the NR, if a large subcarrier is used (e.g., subcarrier spacing of 30 kHz or more), a coverage reduction is inevitable compared to an LTE PUCCH due to a physical factor although a long PUCCH using all 14 symbols within a slot is used due to reduced slot duration.

Accordingly, in such a case, it may be necessary to improve coverage using a multi-slot long PUCCH.

Furthermore, although the same 15 kHz subcarrier spacing as that of LTE is used, the use of a multi-slot long PUCCH may be necessary in order to support the same deployment scenario as that of LTE by securing coverage of a level in which HARQ-ACK is repeated in LTE.

Hereinafter, this specification proposes a method of setting and operating the slot number of a multi-slot long PUCCH by considering various numerologies in the NR and corresponding coverage influence.

Method of setting the number of slots in a multi-slot long PUCCH

The NR system may configure and select a plurality of slot lengths in which a multi-slot long PUCCH is spanned for each UE by considering that there is a difference in the path loss depending on the location of a UE when a multi-slot long PUCCH is used for the above reason.

For example, if the slot number of a multi-slot long PUCCH is set to 4 and selected, a multi-slot long PUCCH slot number may have a form such as X={x0, x1, x2, x3}.

In this case, the slot number may have a relation of x0<=x1<=x2<=x3. A non-multi-slot or single slot long PUCCH may be selected by setting x0=1.

In this case, the greatest value (e.g., x3) of multi-slot long PUCCH slot numbers X may be set to satisfy a maximum coverage/link budget/MCL necessary for a minimum cell.

Furthermore, middle values (e.g., x1, x2) may be set as values smaller than the greatest value (e.g., x3) so that a minimum slot number necessary for a given situation is allocated.

Furthermore, the multi-slot long PUCCH slot number may be UE-specific RRC configured or may be configured through dynamic indication through DCI.

Furthermore, a method of UE-specifically RRC configuring multiple (e.g., 4) multi-slot long PUCCH slot lengths and dynamically indicating them through DCI may be considered.

In this case, PUCCH coverage also has a correlation with long PUCCH duration, subcarrier spacing, etc. in addition to the number of slots in a multi-slot long PUCCH.

Accordingly, in order to determine the value of the slot number in a multi-slot long PUCCH supporting various types of coverage as described above, specific long PUCCH duration and subcarrier spacing need to be assumed.

Hereinafter, in this specification, the assumed long PUCCH duration and subcarrier spacing are referred to as reference long PUCCH duration Lref and reference subcarrier spacing Sref, respectively. The determined slot number of a multi-slot long PUCCH is referred to as Xref.

Furthermore, long PUCCH duration and subcarrier spacing actually used for long PUCCH transmission in NR may be the same or different from the reference values.

In this case, values used for actual transmission are called actual long PUCCH duration L and actual subcarrier spacing S, respectively.

In the above, the reference or actual long PUCCH duration may mean 1) the total number of symbols including an UCI symbol and a DMRS symbol configuring a PUCCH or 2) the number of UCI symbols used for UCI transmission among symbols configuring a PUCCH.

In this case, the NR can support various types of long PUCCH duration and subcarrier spacing as described above in addition to the Lref and Sref values. The following methods are proposed as a method of setting a multi-slot long PUCCH slot number in the NR by considering such a situation.

Method of Setting the Number of Slots in a Multi-Slot Long PUCCH According to Long PUCCH Duration in the Same Subcarrier Spacing In the same subcarrier spacing (e.g., reference subcarrier spacing), long PUCCH duration L may be different from reference long PUCCH duration Lref.

In this case, assuming that separate multi-slot long PUCCH slot number values for each long PUCCH duration, for example, four values for each long PUCCH duration can be set, Y={y0, y1, y2, y3}, Z={z0, z1, z2, z3}, etc. may be set.

In this case, a UE may select one of multiple multi-slot long PUCCH slot numbers (e.g., Y, Z, . . . ) configured based on long PUCCH duration configured according to a separate method.

Furthermore, one of the values of the selected multi-slot long PUCCH slot numbers may be configured according to a multi-slot long PUCCH slot number indication method, and a multi-slot long PUCCH may be configured.

For example, if a multi-slot long PUCCH slot number Y has been selected by long PUCCH duration L, one of Y values, for example, {y0, y1, y2, y3} may be UE-specific RRC configured or may be configured through dynamic indication through DCI.

Alternatively, after the slot number of multiple (e.g., 4) multi-slot long PUCCHs is UE-specifically RRC configured, it may be dynamically configured through DCI.

In this case, the method has a disadvantage in that signaling overhead is great because a separate multi-slot long PUCCH slot number is set every long PUCCH duration.

Accordingly, in order to improve this disadvantage, after only a reference multi-slot long PUCCH slot number Xref assuming Lref and Sref is set, a multi-slot long PUCCH slot value according to long PUCCH duration configured with respect to a UE may be implicitly indicated through Xref and Lref.

In this case, long PUCCH duration may be called L, and a corresponding multi-slot long PUCCH slot number may be called Y.

Thereafter, a UE may calculate Y for long PUCCH duration configured thereto like Equation 2 using L and Lref, and Xref as follows.

$$Y = Xref \times L_{ref}/L \qquad [\text{Equation 2}]$$

In this case, Lref may be the longest long PUCCH duration (i.e., Lref=14) by considering that the motivation of a multi-slot long PUCCH is coverage extension.

If Lref/L is not an integer (e.g., Lref=14 and L=10), it may be made an integer through ceiling, floor, truncation, etc.

Making an integer may be a ceiling operation, such as Equation 3, Equation 4, in order to find out the smallest value of integers that satisfy coverage/link budget/MCL.

$$Y = \lceil Xref \times L_{ref}/L \rceil \qquad [\text{Equation 3}]$$

$$Y = Xref \times \lceil L_{ref}/L \rceil \qquad [\text{Equation 4}]$$

In this case, ⌈ ⌉ means a ceiling operation.

For example, if Xref={1, 4, 16, 64} when Lref=14, Xref×$L_{ref}$/L={0.71, 2.86, 11.4, 45.7} when L=10. The final Y value to which ceiling has been applied is Y={1, 3, 12, 64}.

In this case, a UE may configure a multi-slot long PUCCH using Y calculated using the above method.

Furthermore, the ceiling operation may be substituted with another integer method, such as floor or truncation.

In addition, in the state in which a set Xref={1, x1, x2, x3} for the number of slots configurable with respect to reference PUCCH symbol duration Lref (e.g., Lref=14 symbols) has been defined, a gNB may configure one value (e.g., x1=2, x2=4, x3=6 or 8) within corresponding Xref with respect to a UE.

In this case, if one value of Xref allocated by the gNB is xref, a multi-slot long PUCCH slot number y to be applied to actual transmission may be set by the following method.

(Method 1)

If xref>1 and actual PUCCH symbol duration is given as L symbols, the actual number of slots y may be set like Equation 5.

$$y = xref \times f\{Lref/L\} \qquad [\text{Equation 5}]$$

In this case, f{·} may be a function, such as ceiling, flooring or truncation.

(Method 2)

If xref=1, the actual number of slots y may be set as y=1 with respect to given actual PUCCH symbol duration L.

Method of Setting the Number of Slots in a Multi-Slot Long PUCCH when Subcarrier Spacing Varies As described above, PUCCH coverage also has a correlation with subcarrier spacing in addition to the number of slots and long PUCCH duration in a multi-slot long PUCCH.

Accordingly, if long PUCCH duration is given as a symbol number, when subcarrier spacing becomes N times even in the case of the same long PUCCH duration, the absolute time of a long PUCCH length becomes 1/N times. Accordingly, if transmission power is constant, PUCCH coverage is reduced proportionately.

Furthermore, in the proportion relation, since received power is inverse proportion to the square of the distance between a transmitter and a receiver, coverage converted into the distance is inverse proportion to the square of transmission energy, that is, transmission power× transmission duration.

Accordingly, when subcarrier spacing becomes N times in the above example, PUCCH coverage converted into the distance becomes $1/\sqrt{N}$ times because long PUCCH transmission energy becomes 1/N times.

Furthermore, PUCCH coverage requirements may be different depending on subcarrier spacing. This may be represented as a maximum timing advance (max TA) configuration method according to the following subcarrier spacing.

In this case, the max TA may be configured for each subcarrier spacing, may be configured as the same max TA value regardless of subcarrier spacing, or may be configured as a system information block (SIB).

Furthermore, if the max TA is configured for each subcarrier spacing, the max TA may be configured to have a relation inversely proportional to subcarrier spacing or inversely proportional to a square root.

Accordingly, the following multi-slot long PUCCH slot number setting method in each case may be considered.

If Max TA is Scaled According to Subcarrier Spacing

If max TA is scaled as a relation inversely proportional to subcarrier spacing (e.g., when subcarrier spacing becomes N times compared to Sref, max TA is scaled to become 1/N times or $1/\sqrt{N}$), it may be expected that PUCCH coverage according to subcarrier spacing is also reduced at the same ratio.

Accordingly, the UE may configure a multi-slot long PUCCH by identically applying a value set based on Sref although subcarrier spacing used for PUCCH transmission has a value different from Sref.

That is, in the case of a reference multi-slot long PUCCH slot number Xref assuming Lref and Sref, the UE may apply an Xref value as a multi-slot long PUCCH slot number Y for long PUCCH duration L configured for the UE without any change regardless of subcarrier spacing with respect to the same long PUCCH duration L as Lref.

$$Y = Xref \qquad [\text{Equation 6}]$$

In this case, the UE may configure a multi-slot long PUCCH using Y calculated using Equation 6.

If Max TA is Fixed Regardless of Subcarrier Spacing

The following relates to a method of setting a multi-slot long PUCCH slot number when Max TA is a fixed value regardless of subcarrier spacing.

In other words, if all UEs operating according to various subcarrier spacings are configured to support the same PUCCH coverage, a multi-slot long PUCCH slot number may need to be adjusted by considering that coverage is reduced depending on subcarrier spacing.

As described above, when subcarrier spacing S becomes N times, that is, S=N*Sref, temporal coverage is reduced in a relation inversely proportional to a square root when the same PUCCH transmission power is assumed because PUCCH transmission duration becomes 1/N times.

Accordingly, in this case, in order to compensate for a coverage reduction, PUCCH transmission duration may be set to be identical with the case of Sref by increasing PUCCH transmission power N times or increasing a multi-slot long PUCCH slot number N times in the same PUCCH transmission power.

In this case, in the NR in which various subcarrier spacings coexist, the same coverage or max TA may need to be supported regardless of subcarrier spacing.

In this case, the UE may calculate Y for long PUCCH duration L configured therefor using subcarrier spacing S and Sref, and Xref as in Equation 7 with respect to the same long PUCCH duration L as Lref.

$$Y = Xref \times (S/S_{ref})$$ [Equation 6]

In this case, the UE may configure a multi-slot long PUCCH using Y calculated using the method of Equation 7.

If Max TA is SIB Configurable

If Max TA is configurable as an SIB, assuming that max TA assumed when a reference multi-slot long PUCCH slot number Xref is determined is TAmaxref and configured max TA is TAmax, a multi-slot long PUCCH slot number may be determined using the relation between TAmax and TAmaxref.

As described above, in general, since received power is in inverse proportion to the square of the distance between a transmitter and a receiver, in other words, in order to increase coverage converted into the distance N times, transmission energy needs to be increased $N^2$ times.

In order to increase transmission energy $N^2$ times, transmission power may be increased $N^2$ times or transmission duration needs to be increased $N^2$ times in the case of the same transmission power.

However, transmission power may not be increased like a coverage limited situation.

In this case, the UE may calculate a multi-slot long PUCCH slot number Y for long PUCCH duration L configured therefor according to a method, such as Equation 8, using the relation between TAmax and TAmaxref as in Equation 8, assuming the same PUCCH transmission power as that when Xref is determined.

$$Y = Xref \times (TAmax/TAmax_{ref})^2$$ [Equation 8]

More generally, the UE may calculate a multi-slot long PUCCH slot number Y for long PUCCH duration L configured therefor according to a method, such as Equation 9, using the relation between TAmax and TAmaxref as follows.

$$Y = Xref \times (TAmax/TAmax_{ref})^M$$ [Equation 9]

In Equation 9, M may representatively have a value of 1 or 2 and may be a value determined by considering a path loss situation of a channel.

In addition, the UE may calculate a multi-slot long PUCCH slot number Y for long PUCCH duration L configured therefor using Equation 10 by considering that subcarrier spacing S is different from Sref.

$$Y = Xref \times (S/S_{ref})(TAmax/TAmax_{ref})^M$$ [Equation 10]

The UE may configure a multi-slot long PUCCH using Y calculated according to a method, such as Equation 10.

If the methods are generalized, they may be represented like Equation 11.

$$Y = Xref \times \frac{(S/S_{ref})}{(L/L_{ref})}(TAmax/TAmax_{ref})^M$$ [Equation 11]

RRC parameters according to long PUCCH duration and/or subcarrier spacing and/or max TA may be configured using the relation equation.

In this case, the UE may configure a multi-slot long PUCCH by calculating a multi-slot long PUCCH slot number from Xref using Equation 11.

If the UE configures a multi-slot long PUCCH using the method, the UE may set one of multi-slot long PUCCH slot number Y values (e.g., {y0, y1, y2, y3}) calculated using the relation to "1" so that a single-slot long PUCCH (i.e., the number of slots of the multi-slot long PUCCH=1) can be selected.

For example, a multi-slot long PUCCH may be made off by substituting (e.g., {1, y1, y2, y3}) the greatest value of the Y values with "1."

Alternatively, for the above object, "1" may be basically supported, and the remaining values may be configured to be scaled with the relation equation between long PUCCH duration, subcarrier spacing and max TA like the methods.

In this case, power of a received signal is in inverse proportion to the square of the center frequency, assuming that power of a transmitted signal is constant and an antenna proportional to the wavelength size of a carrier frequency of the transmitted signal is used.

In this case, since an UL transmission range and a cell range are reduced according to the same relation, the UE may identically apply a multi-slot long PUCCH slot number Y value determined in an UL reference carrier frequency.

Furthermore, the UE may configure a multi-slot long PUCCH slot number Y value for each carrier frequency by considering that a change in the antenna size and received power in an eNB according to beamforming may be different.

Furthermore, if beamforming is applied, the UE may scale and apply the beamforming at a path loss rate measured for each beam by incorporating a difference in the path loss for each beam.

For example, assuming that the path losses of a beam1 and a beam2 measured using channel state information (CSI) or a sounding reference signal (SRS) through DL or UL are PL1 and PL2, respectively, the UE may determine a multi-slot long PUCCH slot number to be Y2 when it transmits the beam2 using the ratio of PL1 and PL2.

For example, if the UE performs transmission using the same transmission power P due to a power limitation, eNB-received power for a signal transmitted using the beam1 is P*PL1, and received power of the beam2 is P*PL2, a multi-slot long PUCCH slot number may be scaled and applied at the ratio of PL1/PL2.

In other words, if the UE that transmits a multi-slot long PUCCH using the beam1 and changes the beam into the beam2 and performs transmission using the same transmission power, assuming that a multi-slot long PUCCH slot number when the beam1 is transmitted is Y1, the Y2 value of a multi-slot long PUCCH slot number when transmission is performed using the beam2 may be determined to have a relation, such as Equation 12.

$$Y2 = Y1 \times (PL1/PL2) \quad \text{[Equation 12]}$$

Skipping or Rate Matching Operation in Multi-Slot Long PUCCH

PUCCH symbol duration L and a PUCCH transmission period or a corresponding multi-slot long PUCCH slot number may be RRC configured values (RRC configuration) or may be valued indicated or determined through DCI among multiple RRC configured candidate values (RRC configuration+DCI indication).

In contrast, an actually available PUCCH symbol value La within a specific PUCCH slot may be smaller than L due to a DL symbol or a gap period or other UL resources (e.g., short PUCCH, an SRS).

In such a case, the La value may be a value dynamically indicated through DCI or may be a value determined by other dynamic parameter(s) transmitted through DCI.

For example, the La value may be a value indicated or determined by a slot format indicator (SFI) that notifies a UE of the type of slot through DCI.

Accordingly, this specification proposes an operation according to the following method if PUCCH symbol duration La in which PUCCH transmission is possible within a specific PUCCH slot dynamically determined due to a DL symbol or a gap period or other UL resources (e.g., short PUCCH, an SRS) is smaller than L in the state in which PUCCH symbol duration L and a PUCCH transmission period or a corresponding multi-slot long PUCCH slot number have been indicated/configured by the RRC configuration method or the RRC configuration+DCI indication method as described above.

(Method 1)

Method 1 is to skip PUCCH transmission in a corresponding slot.

In this method, an actually transmitted long PUCCH slot number is reduced as much as PUCCH transmission has been skipped compared to a multi-slot long PUCCH slot number configured by the RRC configuration or RRC configuration+DCI indication method.

(Method 2)

Method 2 is a method of skipping PUCCH transmission in a corresponding slot, but extending the number of skipped slots by incorporating it into the set period or multi-slot long PUCCH slot number.

In this method, a multi-slot long PUCCH slot number configured by the RRC configuration or RRC configuration+DCI indication method and an actually transmitted long PUCCH slot number are the same.

(Method 3)

In Method 3, when PUCCH symbol duration La becomes P % or more of L or when (L-LA) is Q symbols or less, a PUCCH is transmitted in corresponding La symbol duration. When La is less than P % of L or when (L-LA) exceeds Q symbols, Method 1 or Method 2 is applied.

In other words, if actually available long PUCCH duration is reduced to Q symbols or less due to a dynamic configuration compared to long PUCCH duration L configured by the RRC configuration or RRC configuration+DCI indication method, a PUCCH is transmitted through rate-matching based on La symbols. If not (i.e., when a difference between L and La is greater than the Q symbols), Method 1 or Method 2 is applied.

Furthermore, a PUCCH is transmitted through rate-matching based on La symbol duration only when Q symbols or less are not available if the first Q symbol or less or the last Q symbol or less or the first some symbol and the last some symbol are added in L symbol locations originally configured/indicated through RRC/DCI. If not, a method of applying Method 1 or Method 2 is also possible.

In the case of Method 3, a UCI coded bit may be punctured by (L-La) symbols in the state in which it has been generated based on L symbols and mapped/transmitted or a UCI coded bit may be generated based on La symbols through rate-matching based on La symbols and mapped/transmitted.

In the above, a method of applying Method 1, 2 in the case of a time-domain OCC-based long PUCCH (e.g., for up to 2 bits) or a method of applying Method 1, 2, 3 in the case of a long PUCCH (e.g., for more than 2 bits) not based on a time-domain OCC is possible.

In the above, the number of symbols L or La corresponding to the PUCCH symbol duration may mean the total number of symbols of the sum of an UCI symbol and DMRS symbol configuring a PUCCH or may mean the number of symbols in which UCI is transmitted among symbols configuring a PUCCH.

In this case, a UE may have one of the methods configured from higher layers and the UE may be indicated in spec so that it operates according to only one of the methods.

PUCCH Resource Configuration Method in Pre-DFT OCC-Based Long PUCCH

In the NR, in order to support large UCI payload and user multiplexing at the same time, a method of transmitting a long PUCCH based on a pre-discrete Fourier transform (DFT) OCC may be considered.

In this case, the OCC means an orthogonal cover code used for user classification, and may be a Walsh code or DFT sequence.

In this case, an OCC length in a pre-DFT-based long PUCCH may be set by considering a user multiplexing capacity to be supported and UCI payload to be transmitted.

UCI payload that may be transmitted in the pre-DFT-based long PUCCH is in inverse proportion to an OCC length.

Accordingly, the OCC length may be flexibly set through higher layer signaling or dynamic indication through DCI by considering UCI payload and a user multiplexing capacity.

Furthermore, for the coherent demodulation of a PUCCH, reference signal (RS) transmission for channel estimation is necessary for each UE.

In this case, the following method may be considered as an orthogonal RS transmission method for channel separation between users.

(Method 1)

This is a code division multiplexing (CDM) transmission method.

The CDM transmission method is a method of overlapping and transmitting (quasi-)orthogonal codes.

For example, if a PUCCH is transmitted in 1 RB, an RS for each UE may be transmitted the entire RB (sequence length=12).

In this case, orthogonal sequences may be different time domain cyclic shifts (CSs) in the same sequence.

(Method 2)

This is a frequency division multiplexing (FDM) transmission method.

The FDM transmission method is a transmission method using different frequency resources. Transmission may be performed by contiguously allocating frequency resources (contiguous FDM) or transmission may be performed for each UE or in a manner crossing a comb form (comb type FDM).

Hereinafter, some methods of defining the PUCCH resource of a pre-DFT OCC-based long PUCCH by considering the UCI and RS transmission methods are proposed.

(Method 1)

Method of Defining PUCCH Resources by Pairing a UCI Part (OCC) and an RS

Method 1-A: Method of Defining a PUCCH Resource by Pairing an OCC (UCI) and a Comb Index (RS)

A case where cross transmission of a comb form is used among FDM RS transmission methods is described as an example. If a length-N OCC has been configured in a UCI part, assuming that the code index of each of the N OCCs is n (0<=n<N, n: integer), N PUCCH resources may be configured by pairing n and each of N RS combs {(0, N, 2N, . . . ), (1, N+1, 2N+1, . . . ), . . . (N−1, 2N−1, 3N−1, . . . )}.

Method 1-B: Method of Defining PUCCH Resources by Pairing an OCC (UCI) and a Contiguous FDM Index (RS)

For example, if a length-N OCC has been configured in a UCI part and the number of subcarriers used for PUCCH transmission is N PUCCHs, assuming that the code index of each of the N OCCs is n (0<=n<N, n: integer), N PUCCH resources may be configured by pairing n and each of N RS FDMs {(0, 1, 2, . . . ), (NPUCCHSC/N, NPUCCHSC/N+1, NPUCCHSC/N+2, . . . ), . . . (NPUCCHSC-NPUCCHSC/N, NPUCCHSC-NPUCCHSC/N+1, NPUCCHSC-NPUCCHSC/N+2, . . . )}.

Method 1-C: Method of Defining PUCCH Resources by Pairing an OCC (UCI) and a CS (RS)

If an RS is classified based on a different CS among CDM RS transmission methods, if a length-N OCC has been configured in a UCI part, assuming that the code index of each of the N OCCs is n (0<=n<N, n: integer), N PUCCH resources may be configured by pairing n and each of N CS indices m (0<=m<N, m: integer).

If users are multiplexed, it is advantageous in terms of channel estimation as a DMRS CS distance between users increases. When pairing is performed as described above by considering such an advantage, CSs=0, 3, 6, 9 may be defined to be paired with OCC code indices n=0, 1, 2, 3, respectively, with respect to an OCC length 4, and (n=0,1), CS=0,6 may be paired in the case of an OCC length 2.

Method 1-D: Method of Defining PUCCH Resources by Pairing an OCC (for UCI) and a Combination of (Comb Type FDM, CS) (for RS)

For example, if a length-N OCC has been configured in a UCI part, assuming that the code index of each of the N OCCs is n (0<=n<N, n: integer), N PUCCH resources may be configured by pairing a code index n applied to UCI and N combinations of (comb, CS) for an RS configuration.

In this case, assuming that the number of combs configuring N RS index combinations is Ncomb and the number of CSs is Ncs, N=Ncomb×Ncs is satisfied.

For example, if N=4, (comb, CS) combinations corresponding to four RS indices may be configured (in this case, X>0) as (even subcarrier index, CS=0), (even subcarrier index, CS=X), (odd subcarrier index, CS=0), (odd subcarrier index, CS=X).

Method 1-E: Method of Defining PUCCH Resource by Pairing an OCC (for UCI) and a Combination of (Contiguous FDM, CS) (for RS)

For example, if a length-N OCC has been configured in an UCI part, assuming that the code index of each of the N OCCs is n (0<=n<N, n: integer), N PUCCH resources may be configured by pairing a code index n applied to UCI and N (contiguous FDM, CS) combinations for an RS configuration.

In this case, assuming that the number of contiguous FDMs configuring N RS index combinations is Nfdm and the number of CSs is Ncs, N=Nfdm×Ncs is satisfied.

For example, if N=4, (contiguous FDM, CS) combinations corresponding to four RS indices may be configured (in this case, X>0) as (subcarrier index 0~NPUCCHSC/2−1, CS=0), (subcarrier index 0~NPUCCHSC/2−1, CS=X), (subcarrier index NPUCCHSC/2~NPUCCHSC−1, CS=0), (subcarrier index NPUCCHSC/2~NPUCCHSC−1, CS=X).

Method 1-A to Method 1-E are methods of generating N combinations by previously designating a 1-to-1 correspondence relation with respect to N UCI OCC indices and N RS indices (e.g., CS index, comb index, contiguous FDM index) or a combination of them.

In this case, the 1-to-1 correspondence relation of an OCC (UCI) and an RS may be fixed in spec as one of Methods 1-A~E or may be configured as one of the methods through RRC signaling.

For example, this may be a form indicating whether a PUCCH resource has been defined by pairing the comb index (Method 1-A) of an RS with an OCC (UCI) using RRC signaling 1 bit or whether a PUCCH resource has been defined by pairing CS indices (Method 1-C) of an RS.

(Method 2)

Method 2 is a method of defining a UCI part and a combination of all RSs as PUCCH resources.

In other words, if Method 1 has made one RS index correspond to one OCC in, Method 2 is a method of defining PUCCH resources so that they can be selected by making all or multiple RSs correspond to one OCC.

For example, this is a method of defining PUCCH resources so that two RS indices correspond to one OCC so that the PUCCH resources are selected.

In this case, the two indices may be different comb indices or may be different contiguous FDM indices or may be different CS indices.

Interference Randomization Method Between Cells in a Pre-DFT OCC-Based Long PUCCH Each symbol OCC is used to support multiplexing between users in the pre-DFT OCC-based long PUCCH transmission method.

If the OCC is used, orthogonality between users using different OCC codes within the same cell is guaranteed, but interference between cells may still occur.

For example, the inter-cell interference may be interference between UEs using the same OCC code of different cells.

Accordingly, this specification proposes that cell-specific symbol-/hop-/slot-level OCC hopping is applied to a pre-DFT OCC-based long PUCCH for inter-cell interference randomization in such a situation.

In this case, the cycle of cell-specific OCC hopping may be a symbol unit or may be a frequency hop unit if frequency hopping has been configured or may be hopping (inter-slot OCC hopping) of a slot unit.

Furthermore, in cell-specific symbol-/hop-/slot-level OCC hopping, OCC hopping may be performed based on a random hopping pattern classified for each cell.

In this case, in order to generate a special symbol-/hop-/slot-level OCC hopping pattern for each cell, a random hopping pattern generation method derived by a physical cell ID or virtual cell ID may be used.

In addition, a configuration may be performed by higher layer signaling so that a physical cell ID and a virtual cell ID are selected as parameters used for the random hopping pattern generation method.

Furthermore, a UE may generate a cell-specific symbol-/hop-/slot-level OCC hopping pattern without separate additional signaling through an allocated OCC index, symbol/hop/slot index, cell ID, etc., and may transmit UCI information.

Furthermore, if cell-specific symbol-/hop-/slot-level OCC hopping is applied to UCI in a pre-DFT OCC-based long PUCCH, a UE generates a PUCCH RS necessary for the channel estimation of a UCI transmission channel with reference to the CS/comb index/contiguous FDM index of an RS paired with an OCC (UCI part) allocated thereto according to the "method of defining PUCCH resources by pairing a UCI part (OCC) and an RS."

Alternatively, the UE may refer to the CS/comb index/contiguous FDM index of an RS configured with respect to an OCC (UCI part) allocated therefor according to the "method of defining PUCCH resources by pairing a UCI part and a combination of all RSs."

In this case, in the case of the RS, 1) the same one RS within a slot is configured and the corresponding RS may be determined to have been paired with a specific (e.g., first) symbol within a long PUCCH or an OCC used for a specific (e.g., first) frequency hop or 2) one RS is configured for each frequency hop and the corresponding RS may be determined to have been paired with a corresponding frequency hop or an OCCU used for a specific (e.g., first) symbol within the frequency hop.

In contrast, if an OCC (for UCI) and a CS/comb index/contiguous FDM index (for RS) are previously paired and resources have been allocated, in order to perform inter-cell interference randomization, CS/comb index/contiguous FDM index (for RS) hopping is performed on an RS. A UE may obtain OCC information to be applied to (paired) UCI through corresponding RS hopping information, and may apply the OCC information to a UCI part.

Multi-Slot Long PUCCH Transmission Operation in a Dynamic TDD Situation

Hereinafter, an operation of transmitting a long PUCCH using a multi-slot in a dynamic time division duplex (TDD) situation is described.

In this case, the operation of transmitting a long PUCCH using multiple slots may include an operation of repeatedly transmitting a long PUCCH in multiple slots.

In this specification, TDD may be referred to as an unpaired spectrum or frame structure type 2, and frequency division duplex (FDD) may be referred to as a paired spectrum or frame structure type 1.

Hereinafter, the transmission of a long PUCCH using multiple slots is briefly expressed as a "multi-slot long PUCCH."

The NR is dynamically adapted in response to a change in the amount of uplink (UL) traffic and/or downlink (DL) traffic, and may support dynamic TDD in order to efficiently support TDD between different services (e.g., low latency service, high data rate service).

In this case, as a method of supporting dynamic TDD, a DL slot, an UL slot, an unknown slot, a reserved slot may be configured semi-statically or dynamically.

In this case, the "reserved slot" is a slot TDDed with another system or used for a gNB for other specific uses other than the DL and/or UL data transmission of NR, and may be a slot in which the UL and/or DL data transmission of NR is not permitted.

Furthermore, the "unknown slot" may be used for an object basically identical with or similar to the reserved slot.

In this case, the "unknown slot" is a slot through which a gNB supports dynamic DL and/or UL transmission if necessary, and means a slot capable of overriding a slot format.

In this case, a slot format, such as a DL/UL/unknown slot, may be configured by a gNB semi-static or dynamically.

A slot format configured as described above may be indicated by a semi-static slot format indicator (SFI) (in the case of a semi-static configuration) or a dynamic SFI (in the case of a dynamic configuration) with respect to a UE.

Furthermore, the reserved slot may be semi-statically configured by a gNB and may be indicated through semi-static RRC signaling with respect to a UE.

In this case, the DL/UL/unknown/reserved may have been configured in a symbol unit semi-statically or dynamically.

In this case, when a multi-slot long PUCCH is transmitted in N slots, the transmission duration of a multi-slot long PUCCH is configured by a stating slot and the number of slots. In such a semi-static and/or dynamic TDD situation, a multi-slot long PUCCH may operate according to the following methods (Option 1-1 to Option 1-2).

(Option 1-1)

Option 1-1 is a method of transmitting the first slot of a multi-slot long PUCCH in a slot designated as a starting slot (UL or regardless of unknown) and transmitting a subsequent (N−1) slot(s) only in a slot configured as UL through a semi-static SFI (or a dynamic SFI).

More specifically, the subsequent (N−1) slot(s) may be transmitted only in a slot configured as UL by a semi-static SFI or may be transmitted in a slot configured as UL by a semi-static SFI and additionally a slot configured as UL by a dynamic SFI.

In this case, the subsequent (N−1) slot(s) means slots in which the multi-slot long PUCCH is transmitted.

(Option 1-2)

Option 1-2 is a method of transmitting the first slot of a multi-slot long PUCCH in a slot designated as a starting slot (UL or regardless of unknown) and then transmitting (N−1) slots only in a slot configured as UL or unknown by a semi-static SFI (or a dynamic SFI).

More specifically, the subsequent (N−1) slot(s) may be transmitted only in a slot configured as UL by a semi-static SFI or may be transmitted in a slot configured as UL by a semi-static SFI and additionally a slot configured as UL by a dynamic SFI.

In this case, in Option 1-1, 1-2, the first slot transmission may be valid only when the starting slot is configured as unknown or UL through a semi-static SFI (or a dynamic SFI).

In the above, the meaning that a "specific slot has been configured as UL" may mean that all symbols or most of symbols PUCCH transmission duration within a corresponding slot have been configured as UL.

Alternatively, in the above, the meaning that a "specific slot has been configured as UL" may be limited to a case where the number of uplink symbols which may be used for PUCCH transmission within a slot is greater than or equal to configured PUCCH duration (in symbols).

In this case, when the number of uplink symbols which may be used for PUCCH transmission within a slot is smaller than the configured PUCCH duration (in symbols), a corresponding slot may be determined to be not UL or unknown and may operate.

In this case, if DL/UL/unknown/reserved is configured in a symbol unit, the number of uplink symbols may include counting only an UL symbol or may include an UL symbol and unknown symbols.

Furthermore, if some of PUCCH duration (in symbols) configured for PUCCH transmission within a slot is not an UL symbol, the corresponding slot may be determined to be not UL or unknown and operate.

For example, if a difference between PUCCH duration (in symbols) configured for PUCCH transmission within a slot and an UL symbol exceeds 1 symbol, the corresponding slot may be determined to be not UL or unknown and operate.

Alternatively, if duration configured with contiguous uplink symbols which may be used for PUCCH transmission does not fully include duration according to a configured PUCCH starting symbol index and PUCCH duration (in symbols), a corresponding slot may be determined to be not UL or unknown and operate.

Alternatively, if a starting slot in which a multi-slot long PUCCH is transmitted has not been configured as UL through a semi-static SFI (or a dynamic SFI) or UL or unknown, a corresponding slot may operate according to the following methods (Option 2-1 to Option 2-2).

(Option 2-1)

Option 2-1 is a method of transmitting a multi-slot long PUCCH only in N slots configured as UL through a semi-static SFI (or a dynamic SFI) among subsequent slots including a slot designated as a starting slot.

More specifically, a multi-slot long PUCCH may be transmitted only in a slot configured as UL by a semi-static SFI among subsequent slots including a slot designated as a starting slot or may be transmitted in a slot configured as UL by a semi-static SFI and additionally a slot configured as UL by a dynamic SFI.

(Option 2-2)

Option 2-2 is a method of transmitting a multi-slot long PUCCH in N slots configured as UL or unknown through a semi-static SFI (or a dynamic SFI) among subsequent slots including a slot designated as a starting slot.

More specifically, a multi-slot long PUCCH may be transmitted only in a slot configured as UL by a semi-static SFI among subsequent slots including a slot designated as a starting slot or may be transmitted in a slot configured as UL by a semi-static SFI and additionally a slot configured as UL by a dynamic SFI.

In this case, the meaning that a specific slot has been configured as UL may mean that all symbols or most of symbols in PUCCH transmission duration within a corresponding slot have been configured as UL.

Alternatively, the meaning that a specific slot has been configured as UL may be limited to a case where the number of uplink symbols which may be used for PUCCH transmission within a slot is greater than or equal to configured PUCCH duration (in symbols).

In this case, when the number of uplink symbols which may be used for PUCCH transmission within a slot is greater than the configured PUCCH duration (in symbols), the corresponding slot may be determined to be not UL or unknown and operate.

Furthermore, if DL/UL/unknown/reserved is configured in a symbol unit, the number of uplink symbols may include counting only an UL symbol or may include an UL symbol and unknown symbols.

Furthermore, if some of PUCCH duration (in symbols) configured for PUCCH transmission within a slot is not an UL symbol, a corresponding slot may be determined to be not UL or unknown and operate.

For example, if a difference between PUCCH duration (in symbols) configured for PUCCH transmission within a slot and an UL symbol is 1 or exceeds a symbol, the corresponding slot may be determined to be not UL or unknown and operate.

Alternatively, if duration configured a contiguous uplink symbols which may be used for PUCCH transmission does not fully include duration according to a configured PUCCH starting symbol index and PUCCH duration (in symbols), a corresponding slot may be determined to be not UL or unknown and operate.

A specific method may be configured semi-statically or dynamically in such a way as to operate according to one of the above-described four options.

For example, which one of the four options will be applied, which method of Options 1-1 and 1-2 will be applied or which method of Options 2-1 and 2-2 will be applied may be dynamically indicated through DCI indicating PUCCH transmission with respect to a UE.

The multi-slot long PUCCH may skip PUCCH transmission with respect to a slot configured as DL and/or reserved through a semi-static SFI (or a dynamic SFI).

In this case, the omitted slot may be counted as one of N slots allocated for PUCCH transmission or may not be counted.

As described above, in multi-slot long PUCCH transmission in FDD/TDD (or paired/unpaired spectrum), a slot to be actually transmitted may be determined by the following steps.

In this case, the number of transmission slots configured in a corresponding multi-slot long PUCCH may be set as N, and a transmission symbol region within the transmission slot may be configured (or indicated) as K symbols from a symbol #K1.

(Step 1)

In a first step (step 1) of determining a slot for multi-slot long PUCCH transmission, in the case of a semi-static DL/UL configuration, N slots configured with a slot in which K UL symbols from a symbol #K1 have been configured as unknown or UL are determined to be multi-slot long PUCCH transmission slots.

For example, if a multi-slot long PUCCH is indicated (or configured) during 4 slots from a slot #0 and K1=5, K=6 is indicated (or configured), when slots #0/#1/#2/#3/#4/#5/#6 are configured as a DL symbol/all DL symbols/10 DL symbols+four unknown symbols/all unknown symbols/all UL symbols/all UL symbols/all UL symbols by a semi-static DL/UL configuration, slots #3/#4/#5/#6 may be determined as corresponding multi-slot long PUCCH transmission slots.

(Step 2)

Next, in a second step (step 2) of determining a slot for multi-slot long PUCCH transmission, in the case of a dynamic SFI (or group common-PDCCH) configuration, a DL/unknown/UL region may be signaled with respect to a symbol (or slot) configured as unknown by a semi-static DL/UL configuration (or if a semi-static DL/UL configuration has not been configured).

That is, if a dynamic SFI is configured and K UL symbols from a symbol #K1 has not been configured as UL (and/or unknown) with respect to a corresponding slot indicated by a dynamic SFI among slots determined for multi-slot long PUCCH transmission in Step 1 (in particular, slots configured as unknown by a semi-static DL/UL configuration), long PUCCH transmission may not be performed on a corresponding slot.

Furthermore, if a dynamic SFI has been configured, but dynamic SFI information about slots determined for multi-slot long PUCCH transmission in Step 1 (in particular, slots configured as unknown by a semi-static DL/UL configuration) has not been received, long PUCCH transmission may not be performed on a corresponding slot and a rule in which long PUCCH transmission is performed on the corresponding slot may be configured.

In this case, in the case of a multi-slot long PUCCH (or multi-slot PUSCH) indicated by dynamic L1 signaling (e.g., DL assignment, UL grant), multi-slot long PUCCH (or multi-slot PUSCH) transmission may be performed during N slots by applying only Step 1 without applying Step 2.

Furthermore, in the case of a multi-slot long PUCCH (e.g., scheduling request, periodic CSI transmission or multi-slot PUSCH) indicated by RRC signaling (or a combination of RRC signaling and DCI, e.g., semi-persistent transmission), multi-slot long PUCCH (or multi-slot PUSCH) transmission may be omitted in some of N slots by applying both Step 1 and Step 2.

Alternatively, in UCI transmission, multi-slot long PUCCH transmission may be performed during N slots by always applying only Step 1 without applying Step 2 regardless of trigger means (whether it is L1 signaling or RRC signaling).

More specifically, in (multi-slot) data transmission not including UCI, (multi-slot) PUSCH transmission may be omitted in some of N slots by applying both Step 1 and Step 2.

The multi-slot long PUCCH transmission operation in the dynamic TDD situation may be identically applied to a multi-slot PUSCH transmission operation of transmitting a PUSCH in multiple slots for uplink coverage extension.

Multi-Slot PDSCH Reception Operation in a Dynamic TDD Situation

Furthermore, the multi-slot long PUCCH transmission operation may be applied to multi-slot PDSCH transmission in which a PDSCH is transmitted in multiple slots for downlink coverage extension as follows.

(Option 1-1)

The first slot of a multi-slot PDSCH is transmitted in a slot designated as a starting slot (DL or regardless of unknown), and subsequent (N−1) slots are transmitted only in a slot configured as DL through a semi-static SFI (or a dynamic SFI).

In addition, the subsequent (N−1) slots may be transmitted only in a slot configured as DL by a semi-static SFI or may be transmitted in a slot configured as DL by a semi-static SFI and additionally a slot configured as DL by a dynamic SFI.

(Option 1-2)

The first slot of a multi-slot PDSCH is transmitted in a slot designated as a starting slot (DL or regardless of unknown), and subsequent (N−1) slots are transmitted only in a slot configured as DL or unknown through a semi-static SFI (or a dynamic SFI).

In addition, the subsequent (N−1) slots may be transmitted only in a slot configured as DL by a semi-static SFI or may be transmitted in a slot configured as DL by a semi-static SFI and additionally a slot configured as DL by a dynamic SFI.

In this case, the first slot transmission may be valid only when the starting slot is configured as unknown or DL through a semi-static SFI (or a dynamic SFI).

In this case, the meaning that a specific slot has been configured as DL may mean that all symbol or most of symbols in PDSCH transmission duration within the corresponding slot have been configured as DL.

Alternatively, in the above, the meaning that a specific slot has been configured as DL may be limited to a case where the number of DL symbols which may be used for PDSCH transmission within the slot is greater than or equal to configured PDSCH duration (in symbols).

In this case, when the number of DL symbols which may be used for PDSCH transmission within the slot is smaller than the configured PDSCH duration (in symbols), the corresponding slot may be determined to be not DL or unknown and operate.

Furthermore, if DL/UL/unknown/reserved is configured in a symbol unit, the number of DL symbols may include counting only a DL symbol or may include a DL symbol and unknown symbols.

Furthermore, if some of PDSCH duration (in symbols) configured for PDSCH transmission within a slot is not a DL symbol, the corresponding slot may be determined to be not DL or unknown and operate.

For example, if a difference between PDSCH duration (in symbols) configured for PDSCH transmission within a slot and a DL symbol is 1 or exceeds a symbol, the corresponding slot may be determined to be not DL or unknown and operate.

Alternatively, if a starting slot has not been configured as DL through a semi-static SFI (or a dynamic SFI) or DL or unknown, it may operate according to the following method.

(Option 2-1)

A multi-slot PDSCH is transmitted only in N slots configured as DL through a semi-static SFI (or a dynamic SFI) among subsequent slots including a slot designated as a starting slot.

In addition, a multi-slot PDSCH may be transmitted only in a slot configured as DL by a semi-static SFI among subsequent slots including a slot designated as a starting slot or may be transmitted in a slot configured as DL by a semi-static SFI and additionally a slot configured as DL by a dynamic SFI.

(Option 2-2)

A multi-slot PDSCH is transmitted only in N slots configured as DL or unknown through a semi-static SFI (or a dynamic SFI) among subsequent slots including a slot designated as a starting slot.

In addition, a multi-slot PDSCH may be transmitted only in a slot configured as DL by a semi-static SFI among subsequent slots including a slot designated as a starting slot or may be transmitted in a slot configured as DL by a semi-static SFI and additionally a slot configured as DL by a dynamic SFI.

In this case, the meaning that a specific slot has been configured as DL may mean that all symbols or most of symbols in PDSCH transmission duration within a corresponding slot have been configured as DL.

Alternatively, the meaning that a specific slot has been configured as DL may be limited to a case where the number of DL symbols which may be used for PDSCH transmission within the slot is greater than or equal to configured PDSCH duration (in symbols).

In this case, when the number of DL symbols which may be used for PDSCH transmission within the slot is smaller than the configured PDSCH duration (in symbols), the corresponding slot may be determined to be not DL or unknown and operate.

Furthermore, if DL/UL/unknown/reserved is configured in a symbol unit, the number of DL symbols may include counting only a DL symbol or may include a DL symbol and unknown symbols.

Furthermore, if some of PDSCH duration (in symbols) configured for PDSCH transmission within a slot is not a DL symbol, the corresponding slot may be determined to be not DL or unknown and operate.

For example, when a difference between PDSCH duration (in symbols) configured for PDSCH transmission within a slot and a DL symbol is 1 or exceeds a symbol, the corresponding slot may be determined to be not DL or unknown and operate.

In this case, the corresponding slot may be configured semi-statically or dynamically in such a way as to operate according to one of the options.

For example, which method of the four options will be applied or which method of Options 1-1 and 1-2 will be applied or which method of Options 2-1 and 2-2 will be applied may be dynamically indicated through DCI that schedules a PDSCH.

The multi-slot PDSCH may skip PDSCH transmission in a slot configured as UL and/or reserved through a semi-static SFI (or a dynamic SFI).

The omitted slot may be counted as one of N slots allocated for PDSCH transmission or may not be counted.

The PDSCH transmission may mean a PDSCH reception operation from the viewpoint of a UE.

Furthermore, the multi-slot PDSCH reception operation in the dynamic TDD situation may be identically applied to a multi-slot PDCCH transmission operation of transmitting a PDCCH in multiple slots for downlink coverage extension.

Frequency Hopping Operation of Multi-Slot Long PUCCH in a Dynamic TDD Situation

When a PUCCH is repeatedly transmitted in multiple slots for the coverage improvement of the PUCCH, inter-slot frequency hopping may be applied in order to obtain frequency diversity additionally in addition to the repetition gain.

Inter-slot frequency hopping refers to an operation of changing the location of frequency resources transmitted every slot in order to obtain frequency diversity.

A random frequency hopping method and a deterministic method are possible for such inter-slot frequency hopping.

The random frequency hopping method is to generate a frequency hopping pattern through a random number generator every slot.

In addition, the deterministic frequency hopping method may be implemented by determining multiple frequency locations and moving to one of the determined frequency locations every slot, for example.

For simple example, after two frequency resources f1 and f2 are configured through higher layer and/or L1 signaling, an alternative movement to f1 and f2 may be performed every slot.

In this case, a frequency hopping pattern of inter-slot frequency hopping may be defined as the function of a slot index.

Hereinafter, this specification proposes an inter-slot frequency hopping method.

In this hopping method, what a slot capable of PUCCH transmission in dynamic TDD has been limited and may be changed semi-statically or dynamically has been taken into consideration.

First, in the following proposal, the meaning that a specific slot has been configured as UL complies with the definition of Paragraph 3.5 (Multi-slot long PUCCH transmission operation in Dynamic TDD situation).

Furthermore, the meaning that PUCCH transmission is skipped hereinafter means that a PUCCH is considered to have been transmitted and counted a multi-slot long PUCCH transmission number.

Furthermore, the meaning that PUCCH transmission is held (or deferred) hereinafter means that it is not counted as a multi-slot long PUCCH transmission number.

(Method 1)

A new frequency hopping pattern is generated every slot index ns.

In this case, the slot index ns means an index counted regardless of a slot format (UL/DL/unknown/reserved).

In the case of Method 1, with respect to a slot not configured as UL, PUCCH transmission is skipped or held (or deferred), but a frequency hopping pattern is generated regardless of a slot format. In this case, application in the corresponding slot is skipped.

That is, the frequency hopping pattern is generated in all slots, but a generated value is not applied to actual frequency hopping.

Thereafter, when PUCCH transmission is started again in a slot configured as UL, a frequency hopping pattern value newly generated using a corresponding slot index is applied.

In Method 1, for example, in the case of the f1 and f2 frequency hopping, if only an even or odd slot is configured as UL, a frequency diversity gain may not be sufficiently obtained because a PUCCH is transmitted using the f1 or f2 value.

(Method 2)

This is a method of generating a new frequency hopping pattern every UL slot index.

In this case, the UL slot index "ns_u" means an index that counts only a slot configured as UL.

In Method 2, with respect to a case where PUCCH transmission is skipped or held (or deferred) with respect to the slot not configured as UL, the generation of a frequency hopping pattern is also held (or deferred) because a corresponding UL slot index does not increase.

A difference between Method 1 and Method 2 is as follows.

For example, in the f1, f2 frequency hopping, Method 2 can obtain the same frequency diversity gain as that in the case where all slots have been configured UL because a frequency hopping pattern of an f1→f2→f1→f2→, . . . form is maintained although only an even or odd slot has been configured as UL.

(Method 3)

This is a method of generating a frequency hopping pattern based on an UL slot index based on a semi-static slot format configuration.

In this case, the UL slot index "ns_u_ss" means an index that counts only a slot configured as UL by a semi-static slot format configuration.

In Method 3, after a frequency hopping pattern is generated based on a semi-static UL/DL configuration as in Method 2, when some of slots previously configured as UL is changed into DL by a dynamic SFI (e.g., when an unknown slot capable of UL transmission is designated by DCI for DL transmission use), the application of a frequency hopping pattern is skipped.

FIG. 5 is a flowchart showing an example of an operation method of a UE for transmitting a long PUCCH using multiple slots, which is proposed in this specification.

First, the UE receives first information about a time division duplex (TDD) uplink (UL)-downlink (DL) slot configuration from a base station (S510).

Furthermore, the UE receives second information, including a first parameter indicating the number of slots used for a transmission of the long PUCCH and a second parameter indicating a duration of a PUCCH symbol within a PUCCH slot, from the base station (S520).

Furthermore, the UE determines the multiple slots for transmitting the long PUCCH based on the first information and the second information (S530).

The multiple slots for transmitting the long PUCCH may be determined to be a specific number of slots from a configured starting slot.

The specific number of slots may be configured with an UL slot or an unknown slot. Alternatively, the specific number of slots may include an UL slot or an unknown slot.

The UL slot may mean a slot in which the number of UL symbols available for the transmission of the long PUCCH within the slot is greater than or equal to the second parameter.

Furthermore, the UE transmits the long PUCCH to the base station on the multiple slots (S540).

If, the number of UL symbols available for the transmission of the long PUCCH within a specific slot of the determined slots is smaller than the second parameter, the long PUCCH may not be transmitted on the specific slot.

Additionally, the UE may receive a slot format indicator (SFI) for providing notification of a specific TDD UL-DL slot format from the base station after step S510.

Furthermore, the long PUCCH may be transmitted using a pre-discrete Fourier transform (DFT) orthogonal cover code (OCC).

More specifically, the long PUCCH resource may be determined by pairing an OCC related to an uplink control information (UCI) part and a cyclic shift (CS) related to a reference signal.

Contents in which a transmission of the long PUCCH is implemented in a UE device, which are proposed in this specification, are described with reference to FIGS. 5 and 7 to 10.

In a wireless communication system, a UE that transmits a long physical uplink control channel (PUCCH) using multiple slots may include a radio frequency (RF) module for transmitting and receiving radio signals and a processor functionally connected to the RF module.

First, the processor of the UE controls the RF module to receive first information about a time division duplex (TDD) uplink (UL)-downlink (DL) slot configuration from a base station.

Furthermore, the processor controls the RF module to receive second information, including a first parameter indicating the number of slots used for a transmission of the long PUCCH and a second parameter indicating a duration of a PUCCH symbol within a PUCCH slot, from the base station.

Furthermore, the processor determines the multiple slots for transmitting the long PUCCH based on the first information and the second information.

The multiple slots for transmitting the long PUCCH may be determined as a specific number of slots from a configured starting slot.

The specific number of slots may be configured with an UL slot or an unknown slot. Alternatively, the specific number of slots may include an UL slot or an unknown slot.

The UL slot may mean a slot in which the number of UL symbols available for PUCCH transmission within the slot is greater than or equal to the second parameter.

Furthermore, the processor controls the RF module to transmit the long PUCCH to the base station on the multiple slots.

If, the number of UL symbols available for the transmission of the long PUCCH within a specific slot of the determined slots is smaller than the second parameter, the long PUCCH using multiple slots may not be transmitted on the specific slot.

Additionally, the processor may control the RF module to receive a slot format indicator (SFI) for providing notification of a specific TDD UL-DL slot format from the base station.

Furthermore, the long PUCCH may be transmitted using a pre-discrete Fourier transform (DFT) orthogonal cover code (OCC).

More specifically, the long PUCCH resource may be determined by pairing an OCC related to an uplink control information (UCI) part and a cyclic shift (CS) related to a reference signal.

FIG. 6 is a flowchart showing an example of an operation method of a base station for receiving a long PUCCH using multiple slots, which is proposed in this specification.

First, the base station transmits first information about a time division duplex (TDD) uplink (UL)-downlink (DL) slot configuration to a UE (S610).

Furthermore, the base station transmits second information, including a first parameter indicating the number of multiple slots used for a transmission of the long PUCCH and a second parameter indicating a duration of a PUCCH symbol within a PUCCH slot, to the UE (S620).

Furthermore, the base station receives a long PUCCH from the UE on multiple slots (S630).

The multiple slots may be determined to be a specific number of slots from a configured starting slot.

The specific number of slots may be configured with an UL slot or an unknown slot. Alternatively, the specific number of slots may include an UL slot or an unknown slot.

The UL slot may mean a slot in which the number of UL symbols available for the transmission of the long PUCCH within a slot is greater than or equal to the second parameter.

When the number of UL symbols available for the transmission of the long PUCCH within a specific slot of determined slots is smaller than the second parameter, the long PUCCH may not be received on the specific slot.

Additionally, the base station may transmit a slot format indicator (SFI) for providing notification of a specific TDD UL-DL slot format to the UE after step S610.

Furthermore, the long PUCCH may be received using a pre-discrete Fourier transform (DFT) orthogonal cover code (OCC).

More specifically, the long PUCCH resource may be determined by pairing an OCC related to an uplink control information (UCI) part and a cyclic shift (CS) related to a reference signal.

Contents in which the reception of a long PUCCH using multiple slots proposed in this specification with reference to FIGS. 6 to 10 is implemented in a base station apparatus are described.

In a wireless communication system, a base station that receives a long physical uplink control channel (PUCCH) using multiple slots may include a radio frequency (RF) module for transmitting and receiving radio signals and a processor functionally connected to the RF module.

First, the processor of the base station controls the RF module to transmit first information about a time division duplex (TDD) uplink (UL)-downlink (DL) slot configuration to a UE.

Furthermore, the processor controls the RF module to transmit second information, including a first parameter indicating the number of slots used for a transmission of the long PUCCH and a second parameter indicating a duration of PUCCH symbol within a PUCCH slot, to the UE.

Furthermore, the base station controls the RF module to receive a long PUCCH over multiple slots.

The multiple slots may be determined to be a specific number of slots from a configured starting slot.

The specific number of slots may be configured with an UL slot or an unknown slot. Alternatively, the specific number of slots may include an UL slot or an unknown slot.

The UL slot may mean a slot in which the number of UL symbols available for the transmission of the long PUCCH within a slot is greater than or equal to the second parameter.

When the number of UL symbols available for the transmission of the long PUCCH within a specific slot of multiple slots is smaller than the second parameter, the long PUCCH may not be received on the specific slot.

Additionally, the processor may control the RF module to transmit a slot format indicator (SFI) for providing notification of a specific TDD UL-DL slot format to the UE.

Furthermore, the long PUCCH may be received using a pre-discrete Fourier transform (DFT) orthogonal cover code (OCC).

More specifically, the long PUCCH resource may be determined by pairing an OCC related to an uplink control information (UCI) part and a cyclic shift (CS) related to a reference signal.

The above-described methods may be independently performed or may be combined in various ways and performed to perform a transmission/reception of the long PUCCH using multiple slots proposed in this specification.

Overview of Devices to which Present Invention is Applicable

FIG. 7 illustrates a block diagram of a wireless communication device to which methods proposed in this specification may be applied.

Referring to FIG. 7, a wireless communication system includes a base station 710 and multiple user equipments 720 positioned within an area of the base station.

Each of the BS and the UE may be expressed as a wireless device.

The BS 710 includes a processor 711, a memory 712, and a radio frequency (RF) module 713.

The processor 711 implements a function, a process, and/or a method which are proposed in FIGS. 1 to 6 above.

Layers of a radio interface protocol may be implemented by the processor.

The memory is connected with the processor to store various information for driving the processor.

The RF module is connected with the processor to transmit and/or receive a radio signal.

The UE includes a processor 721, a memory 722, and an RF module 723.

The processor implements a function, a process, and/or a method which are proposed in FIGS. 1 to 6 above.

Layers of a radio interface protocol may be implemented by the processor.

The memory 722 is connected with the processor to store various information for driving the processor.

The RF module 723 is connected with the processor to transmit and/or receive a radio signal.

The memories 712 and 722 may be positioned inside or outside the processors 711 and 721 and connected with the processor by various well-known means.

Further, the base station and/or the UE may have a single antenna or multiple antennas.

FIG. 8 illustrates a block diagram of a communication device according to an embodiment of the present invention.

In particular, FIG. 8 is a diagram more specifically illustrating the UE of FIG. 7 above.

Referring to FIG. 8, the UE may be configured to include a processor (or a digital signal processor (DSP) 810, an RF module (or RF unit) 835, a power management module 805, an antenna 840, a battery 855, a display 815, a keypad 820, a memory 830, a subscriber identification module (SIM) card 825 (This component is optional), a speaker 845, and a microphone 850. The UE may also include a single antenna or multiple antennas.

The processor 810 implements a function, a process, and/or a method which are proposed in FIGS. 1 to 6 above. Layers of a radio interface protocol may be implemented by the processor.

The memory 830 is connected with the processor and stores information related with an operation of the processor. The memory 830 may be positioned inside or outside the processor and connected with the processor by various well-known means.

A user inputs command information such as a telephone number or the like by, for example, pressing (or touching) a button on the keypad 820 or by voice activation using the microphone 850. The processor receives such command information and processes to perform appropriate functions including dialing a telephone number. Operational data may be extracted from the SIM card 825 or the memory 830. In addition, the processor may display command information or drive information on the display 815 for the user to recognize and for convenience.

The RF module 835 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 840 functions to transmit and receive the radio signals. Upon receiving the radio signals, the RF module may transfer the signal for processing by the processor and convert the signal to a baseband. The processed signal may be converted into to audible or readable information output via the speaker 845.

FIG. 9 is a diagram illustrating an example of an RF module of the wireless communication device to which the method proposed in this specification may be applied.

Specifically, FIG. 9 illustrates an example of an RF module that may be implemented in a frequency division duplex (FDD) system.

First, in a transmission path, the processors described in FIGS. 7 and 8 process the data to be transmitted and provide an analog output signal to the transmitter 910.

Within the transmitter 910, the analog output signal is filtered by a low pass filter (LPF) 911 to remove images caused by a digital-to-analog conversion (ADC) and up-converted to an RF from a baseband by an up-converter (mixer) 912, and amplified by a variable gain amplifier (VGA) 913 and the amplified signal is filtered by a filter 914, additionally amplified by a power amplifier (PA) 915, routed through a duplexer(s) 950/an antenna switch(es) 960, and transmitted through an antenna 970.

In addition, in a reception path, the antenna 970 receives signals from the outside and provides the received signals, which are routed through the antenna switch(es) 960/duplexers 950 and provided to a receiver 920.

In the receiver 920, the received signals are amplified by a low noise amplifier (LNA) 923, filtered by a bans pass filter 924, and down-converted from the RF to the baseband by a down-converter (mixer) 925.

The down-converted signal is filtered by a low pass filter (LPF) 1426 and amplified by a VGA 927 to obtain an analog input signal, which is provided to the processors described in FIGS. 7 and 8.

Further, a local oscillator (LO) generator 940 also provides transmitted and received LO signals to the up-converter 912 and the down-converter 925, respectively.

In addition, a phase locked loop (PLL) 930 receives control information from the processor to generate the transmitted and received LO signals at appropriate frequencies and provides control signals to the LO generator 940.

Further, circuits illustrated in FIG. 9 may be arranged differently from the components illustrated in FIG. 9.

FIG. 10 is a diagram illustrating another example of the RF module of the wireless communication device to which the method proposed in this specification may be applied.

Specifically, FIG. 10 illustrates an example of an RF module that may be implemented in a time division duplex (TDD) system.

A transmitter 1010 and a receiver 1020 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 9.

A signal amplified by a power amplifier (PA) 1015 of the transmitter is routed through a band select switch 1050, a band pass filter (BPF) 1560, and an antenna switch(es) 1070 and transmitted via an antenna 1080.

In addition, in a reception path, the antenna 1080 receives signals from the outside and provides the received signals, which are routed through the antenna switch(es) 1070, the band pass filter 1060, and the band select switch 1050 and provided to the receiver 1020.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

This specification has an effect in that it can extend coverage by transmitting a PUCCH using a plurality of slots in a dynamic TDD situation.

Furthermore, this specification has an effect in that it can support multiple users and big UCI payload by transmitting a PUCCH based on a pre-DFT OCC.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

An example is applied to the 3GPP LTE/LTE-A/NR system is described primarily, but it is possible to apply the RRC connection method to various wireless communication systems in addition to the 3GPP LTE/LTE-A/NR system.

What is claimed is:

1. A method of transmitting, by a user equipment (UE), a long physical uplink control channel (PUCCH) using a plurality of slots in a wireless communication system, the method comprising:
   receiving, from a base station, first information for a time division duplex (TDD) uplink (UL)-downlink (DL) slot configuration;
   receiving, from the base station, second information including a first parameter for a number of slots used for a transmission of the long PUCCH and a second parameter for a number of symbols used for the transmission of the long PUCCH in a slot;
   determining the plurality of slots for transmitting the long PUCCH based on the first information and the second information; and
   transmitting, to the base station, the long PUCCH over the plurality of slots,
   wherein the plurality of slots are determined by a specific number of slots from a configured starting slot,
   wherein the specific number of slots is configured to an uplink symbol or an unknown symbol,
   wherein a number of symbols available for the transmission of the long PUCCH in the slot is equal to or greater than a value of the second parameter,
   wherein the second information further includes a third parameter for a length of an orthogonal code for the long PUCCH, and
   wherein an index of the orthogonal code corresponds to an index of a cyclic shift related to a reference signal.

2. The method of claim 1, wherein when the number of symbols available for the transmission of the long PUCCH in the slot is smaller than the value of the second parameter, the long PUCCH is not transmitted on the slot.

3. The method of claim 1,
   wherein the TDD-UL-DL slot configuration includes information of a slot format.

4. The method of claim 1, wherein the orthogonal code is a pre-discrete Fourier transform (DFT) orthogonal cover code (OCC).

5. A user equipment (UE) configured to transmit a long physical uplink control channel (PUCCH) using a plurality of slots in a wireless communication system, the UE comprising:

a transceiver configured to transmit and receive radio signals; and a processor functionally connected to the transceiver, wherein the processor is configured to:

receive, from a base station, first information for a time division duplex (TDD) uplink (UL)-downlink (DL) slot configuration;

receive, from the base station, second information including a first parameter for a number of slots used for a transmission of the long PUCCH and a second parameter for a number of symbols used for the transmission of the long PUCCH in a slot;

determining the plurality of slots for transmitting the long PUCCH based on the first information and the second information; and transmitting, to the base station, the multi-slot-based long PUCCH over the plurality of slots, wherein the plurality of slots are determined by a specific number of slots from a configured starting slot, wherein the specific number of slots is configured to an uplink symbol or an unknown symbol, and wherein a number of symbols available for the transmission of the long PUCCH in the slot is equal to or greater than a value of the second parameter.

6. The UE of claim 5, wherein the processor is configured to not transmit the long PUCCH on the slot when a number of symbols available for the transmission of the long PUCCH in the slot is smaller than the value of the second parameter.

7. The UE of claim 5, wherein the TDD-UL-DL slot configuration includes information of a slot format.

* * * * *